United States Patent
Shimizu et al.

(10) Patent No.: US 9,488,849 B2
(45) Date of Patent: *Nov. 8, 2016

(54) COHERENT LIGHT SOURCE DEVICE AND PROJECTOR

(71) Applicant: USHIO DENKI KABUSHIKI KAISHA, Tokyo (JP)

(72) Inventors: Mikio Shimizu, Hyogo (JP); Masashi Okamoto, Hyogo (JP); Yuichi Miura, Hyogo (JP); Takahiro Toma, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 47 days.

This patent is subject to a terminal disclaimer.

(21) Appl. No.: 14/380,285

(22) PCT Filed: Feb. 20, 2013

(86) PCT No.: PCT/JP2013/054083
§ 371 (c)(1),
(2) Date: Aug. 21, 2014

(87) PCT Pub. No.: WO2013/125549
PCT Pub. Date: Aug. 29, 2013

(65) Prior Publication Data
US 2015/0029475 A1      Jan. 29, 2015

(30) Foreign Application Priority Data
Feb. 21, 2012   (JP) .................. 2012-034964

(51) Int. Cl.
*G02B 27/48*  (2006.01)
*G03B 21/20*  (2006.01)
(Continued)

(52) U.S. Cl.
CPC ............ *G02B 27/48* (2013.01); *G03B 21/208* (2013.01); *G03B 21/2033* (2013.01); *G03B 21/2066* (2013.01); *G03B 21/28* (2013.01); *H04N 9/3152* (2013.01); *H04N 9/3161* (2013.01)

(58) Field of Classification Search
CPC .............. G03B 21/14; G03B 21/2033; H04N 9/3129; H04N 9/3161
See application file for complete search history.

(56) References Cited

U.S. PATENT DOCUMENTS 6,577,429 B1 * 6/2003 Kurtz ................... H04N 9/3132
347/239
(Continued)

FOREIGN PATENT DOCUMENTS

JP     H10-133303 A   5/1998
JP     2001-142141 A  5/2001
(Continued)

OTHER PUBLICATIONS

International Search Report issued in Application No. PCT/JP2013/054083, mailed May 28, 2013.
(Continued)

*Primary Examiner* — Sultan Chowdhury
(74) *Attorney, Agent, or Firm* — Michael Best & Friedrich LLP

(57) ABSTRACT

Provided are a coherent light source apparatus and a projector. A first light emission region is formed on basis of a coherent light source; a first optical system projects light derived from a first light emission region to form a second light emission region; a light deflection section deflects a bundle of rays in vicinity of the second light emission region; a second optical system downstream of the light deflection section; and a light mixing section downstream of the second optical system that mixes components of angles and positions of rays incident on an incident end. The second optical system forms an image conjugate to the first light emission region and a third light emission region substantially conjugate to an exit pupil of the first optical system. The light deflection section continues to cause a direction in which the bundle of rays is deflected to be continuously changed.

5 Claims, 19 Drawing Sheets

(51) Int. Cl.
*H04N 9/31* (2006.01)
*G03B 21/28* (2006.01)

(56) References Cited

U.S. PATENT DOCUMENTS

| | | | | |
|---|---|---|---|---|
| 2007/0165202 | A1* | 7/2007 | Koehler | G03F 7/702 355/67 |
| 2009/0257106 | A1* | 10/2009 | Tan | G02B 27/48 359/279 |
| 2010/0245773 | A1* | 9/2010 | Arita | G03B 21/00 353/31 |
| 2011/0234985 | A1* | 9/2011 | Ryf | G03B 21/14 353/38 |
| 2013/0170006 | A1* | 7/2013 | Kurashige | G02B 5/0252 359/15 |

FOREIGN PATENT DOCUMENTS

| | | |
|---|---|---|
| JP | 2004-252112 A | 9/2004 |
| JP | 3975514 B2 | 9/2007 |
| JP | 2011-510358 A | 3/2011 |
| JP | 2012-237810 A | 12/2012 |
| WO | WO-2009/094165 A1 | 7/2009 |

OTHER PUBLICATIONS

Written Opinion of International Searching Authority of PCT/JP2013/054083, mailed May 28, 2013.

* cited by examiner

COHERENT LIGHT SOURCE DEVICE AND PROJECTOR

CROSS REFERENCE TO RELATED APPLICATION

This application claims the benefit of Japanese Priority Patent Application JP 2012-034964 filed Feb. 21, 2012, the entire contents of which are incorporated herein by reference.

TECHNICAL FIELD

The invention relates to a coherent light source apparatus that is usable, for example, in an optical apparatus such as a projector, and uses a coherent light source such as a laser, and relates to a projector that includes such a coherent light source apparatus.

BACKGROUND ART

For example, in a projector for image display such as a DLP™ projector and a liquid crystal projector, a photomask exposure apparatus, etc., a high intensity discharge lamp (an HID lamp) such as a xenon lamp and a super-high pressure mercury lamp has been used. A principle diagram of an example of such a projector is illustrated in FIG. 15 (reference: Japanese Unexamined Patent Application Publication No. 2004-252112, etc.).

In a projector illustrated in FIG. 15, light derived from a light source (SjA) configured of a high intensity discharge lamp or the like is inputted into an incident end (PmiA) of a light uniformizing section (FmA) via a light condensing section (illustration thereof is omitted) configured of a concave reflector, a lens, etc., and is outputted from an emission end (PmoA) thereof. Here, for example, an optical guide may be used as the light uniformizing section (FmA). The optical guide is also called by a name such as a rod integrator or a light tunnel, and may be configured of a rectangular cylinder made of a light transmissive material such as glass or resin. Light inputted into the incident end (PmiA) propagates inside the light uniformizing section (FmA) while being totally reflected by side faces of the light uniformizing section (FmA) repeatedly on the basis of a principle same as that of an optical fiber. This achieves a function of sufficiently uniformizing illuminance on the emission end (PmoA) even when distribution of the light inputted into the incident end (PmiA) is non-uniform.

It is to be noted that, other than that described above that is configured of the rectangular cylinder made of the light transmissive material such as glass or resin, the optical guide mentioned above may be an optical guide configured of a hollow square tube that has inner faces configured of reflectors and causes light to propagate therein while being reflected repeatedly by the inner faces in a similar manner, which thereby achieves a similar function.

An illumination lens (Ej1A) is disposed at a position to face the emission end (PmoA) so that an image of a quadrangle at the emission end (PmoA) is formed on a two-dimensional light amplitude modulation device (DmjA). The two-dimensional light amplitude modulation device (DmjA) is thereby illuminated with the light outputted from the emission end (PmoA). It is to be noted that, in FIG. 15, a mirror (MjA) is disposed between the illumination lens (Ej1A) and the two-dimensional light amplitude modulation device (DmjA).

Further, in accordance with an image signal, the two-dimensional light amplitude modulation device (DmjA) modulates, for each pixel, the light and thereby causes the light to travel in a direction guided to a projection lens (Ej2A), or causes the light to travel in the direction not guided thereto. As a result, an image is displayed on a screen (Tj).

Incidentally, a two-dimensional light amplitude modulation device as that described above may be called a light bulb in some cases. In the case of the optical system illustrated in FIG. 15, a DMD™ (a digital micro-mirror device) is generally used as the two-dimensional light amplitude modulation device (DmjA).

The light uniformizing section may also be that called a fly eye integrator, other than the optical guide described above. A principle diagram of an example of a projector that uses such a light uniformizing section is illustrated in FIG. 16 (reference: Japanese Unexamined Patent Application Publication No. 2001-142141, etc.).

In the projector illustrated in FIG. 16, light derived from a light source (SjB) is inputted, as a substantially-parallel bundle of rays, to an incident end (PmiB) of a light uniformizing section (FmB) configured of a fly eye integrator via a collimator section (illustration thereof is omitted), and is outputted from an emission end (PmoB) of the light uniformizing section (FmB). The light source (SjB) may be configured of a high intensity discharge lamp or the like, and the collimator section may be configured of a concave reflector, a lens, or the like. Here, the light uniformizing section (FmB) is configured of a combination of an upstream fly eye lens (F1B) disposed on the incident side, a downstream fly eye lens (F2B) disposed on the emission side, and an illumination lens (Ej1B). Both of the upstream fly eye lens (F1B) and the downstream fly eye lens (F2B) are formed of a number of quadrangular lenses that have the same focal length and the same shape and are arranged in a matrix.

Each of the lenses in the upstream fly eye lens (F1B) and a corresponding lens in the downstream fly eye lens (F2B) configure an optical system called a Köhler illumination, which means that a number of Köhler illumination optical systems are arranged in a matrix. The Köhler illumination optical system is generally configured of two lenses. In this Köhler illumination system, when the upstream lens condenses light to illuminate a targeted plane, the upstream lens does not form an image of the light source on the targeted plane, but forms the image of the light source on a surface in the center of the downstream lens. Further, the downstream lens is so arranged as to cause an image of a quadrangle of an outer shape of the upstream lens to be formed on a targeted plane (a plane to be illuminated), and the targeted plane is thereby illuminated uniformly. If the downstream lens is not provided, when the light source is not a complete point light source and has a finite size, illuminance of a peripheral portion of the quadrangular targeted plane is degraded depending on the size. A function of the downstream lens is to prevent such a phenomenon. Accordingly, uniform illuminance is achieved, due to the downstream lens, even in the peripheral portion of the quadrangular targeted plane independently of the size of the light source.

Here, in the case of the optical system illustrated in FIG. 16, because it is considered a basis that a substantially-parallel bundle of rays is inputted to the light uniformizing section (FmB), the upstream fly eye lens (F1B) and the downstream fly eye lens (F2B) are so arranged that a spacing therebetween is equal to a focal length thereof. Consequently, an image of a targeted plane of a uniform illumination as the Köhler illumination optical system is generated at the infinite. However, the illumination lens (Ej1B) is disposed downstream of the downstream fly eye lens (F2B). This brings the targeted plane from the infinite onto a focal surface of the illumination lens (Ej1B). A number of Köhler illumination optical systems arranged in a matrix are parallel to an incident optical axis (ZiB) and a bundle of rays is inputted substantially axisymmetrically to a central axis of each of the Köhler illumination optical systems. Because a bundle of output rays is also substantially axisymmetrical, the rays incident on a lens surface at the same angle are refracted toward the same point on the focal surface, independently of an incident position on the lens surface. Due to such properties of the lens, i.e., the Fourier transform function of the lens, all of outputs from the Köhler illumination optical systems are formed into images on the same targeted plane on the focal surface of the illumination lens (Ej1B).

As a result, all of the illumination distributions of the respective lens surfaces in the upstream fly eye lens (F1B) are overlapped with one another. Accordingly, there is formed on the incident optical axis (ZiB) a single image, of synthesized quadrangles, that has illumination distribution more uniform than that in a case where a single Köhler illumination optical system is provided.

By disposing the two-dimensional light amplitude modulation device (DmjB) at a position of the image of the synthesized quadrangles, the two-dimensional light amplitude modulation device (DmjB) which is a target of illumination is illuminated with the light outputted from the emission end (PmoB). It is to be noted that, upon illumination, a polarization beam splitter (MjB) is disposed between the illumination lens (Ej1B) and the two-dimensional light amplitude modulation device (DmjB) to thereby allow the light to be reflected toward the two-dimensional light amplitude modulation device (DmjB).

Further, in accordance with an image signal, the two-dimensional light amplitude modulation device (DmjB) modulates and reflects, for each pixel, the light so as to rotate a polarization direction of the light by 90 degrees or so as not to rotate the polarization direction of the light. Thus, only the rotated light passes through the polarization beam splitter (MjB) to be incident on a projection lens (Ej3B), and an image is displayed on the screen (Tj) accordingly.

It is to be noted that, in the case of the optical system illustrated in FIG. 16, LCOS™ (a silicon liquid crystal device) is generally used as the two-dimensional light amplitude modulation device (DmjA). In a case of such a liquid crystal device, only a component of light that has a specified polarization direction is allowed to be modulated effectively. For this reason, a polarized-light alignment functional device (PcB) may be typically inserted, for example, downstream of the downstream fly eye lens (F2B). The polarized-light alignment functional device (PcB) is for allowing a component parallel to the specified polarization direction to pass therethrough as it is but rotating a polarization direction of a component perpendicular to the specified polarization direction by 90 degrees, and thereby allowing all of the light to be utilized efficiently.

Also, a field lens (Ej2B) may be inserted, for example, immediately upstream of the two-dimensional light amplitude modulation device (DmjB) so that substantially-parallel light is incident on the two-dimensional light amplitude modulation device (DmjB).

It is to be noted that, as the two-dimensional light amplitude modulation device, a transmissive liquid crystal device (LCD) may also be used in an optical arrangement appropriate therefor, other than a reflective device as that illustrated in FIG. 16 (reference: Japanese Unexamined Patent Application Publication No. H10-133303, etc.).

Incidentally, the following measures have been taken in a typical projector to display a color image. Specifically, for example, a dynamic color filter such as a color wheel may be arranged downstream of the light uniformizing section to illuminate the two-dimensional light amplitude modulation device with a bundle of color-sequential rays of R, G, and B (red, green, and blue), which achieves color display in a time-divisional manner. Alternatively, a dichroic mirror, a dichroic prism, or the like may be disposed downstream of the light uniformizing section to illuminate, with light separated into three primary colors of R, G, and B, the two-dimensional light amplitude modulation devices provided independently for the respective colors, and a dichroic mirror, a dichroic prism, or the like may be disposed for performing color synthesis on the bundle of modulated rays of the three primary colors of R, G, and B. It is to be noted that a dichroic mirror, a dichroic prism, or the like is omitted in FIGS. 15 and 16 to avoid complicated illustration.

However, the high intensity discharge lamp described above has had disadvantages such as low efficiency in conversion from supplied electric power into optical power, i.e., a large heat loss, or a short life. As an alternate light source that has overcome these disadvantages, a solid-state light source such as an LED and a semiconductor laser has been attracted attention recently. Out of these, the LED has smaller heat loss and a longer life, compared to the discharge lamp. However, light emitted by the LED has no directivity as with the light emitted by the discharged lamp. This causes an issue of low efficiency in utilizing light in an application in which only light in a particular direction is utilizable, for example, in the projector, the exposure apparatus, or the like described above.

On the other hand, the semiconductor laser has a small heat loss and a long life as with the LED, and has high directivity in addition thereto. Accordingly, the semiconductor laser has an advantage of high efficiency in utilizing light also in the application in which only light in a particular direction is utilizable, for example, in the projector, the exposure apparatus, or the like described above. However, on the other hand, the semiconductor laser has an issue that a speckle occurs.

Here, a speckle is a spotty or patchy pattern that inevitably appears when coherent light is projected. The coherent light may be light of a semiconductor laser, light of any other laser, or light generated, for example, by performing wavelength conversion on laser light (by utilizing non-linear optical phenomenon such as harmonic generation or optical parametric effect). The speckle is an extremely-unwanted phenomenon that largely degrades image quality in application of generating an image to be viewed, for example, the above-described projector, or in an application of precisely exposing a coating film made of a photosensitive material to have a pattern of a photomask. For this reason, many measures have been proposed for a long time for improvement thereof.

For example, Patent Literature 1 describes a laser display apparatus that rotates a fly eye integrator, and thereby rotates, around an optical axis serving as a rotation axis, an angle of light applied onto a two-dimensional light amplitude modulation device.

CITATION LIST

Patent Literature

Patent Literature 1: Japanese Patent No. 3975514

SUMMARY OF THE INVENTION

Problem to be Solved by the Invention

As described above, the fly eye integrator is characterized in achieving uniform illumination distribution by forming, with the use of the downstream fly eye lens, images of outer shapes of the respective lenses in the upstream fly eye lens on the targeted plane in an overlapped manner. However, when the fly eye integrator is rotated as mentioned in Patent Literature 1, the images formed on the targeted plane are also rotated together.

The two-dimensional light amplitude modulation device often has a rectangular shape in accordance with a size of the screen used for projection. Upon rotation of the fly eye integrator, when magnification of an image of the outer shape of the fly eye lens is adjusted so that the entire surface of the two-dimensional light amplitude modulation device is illuminated uniformly, rays that are applied outside of a region of the two-dimensional light amplitude modulation device are increased, which causes an issue of degraded efficiency in utilizing light.

It is desirable to provide a coherent light source apparatus and a projector that are capable of suppressing degradation, in uniformity of projected light, resulting from speckle that occurs upon projection of coherent light.

Means for Solving the Problem

A coherent light source apparatus of an embodiment of the present invention including: a coherent light source; a first optical system configured to project light derived from a first light emission region to form a second light emission region, the first light emission region being formed on basis of the coherent light source; a light deflection section configured to deflect a bundle of rays in vicinity of the second light emission region, the bundle of rays being related to formation of the second light emission region; a second optical system provided downstream of the light deflection section; and a light mixing section provided downstream of the second optical system, and configured to mix components of angles and positions of rays incident on an incident end of the light mixing means. The second optical system is configured to form, in distance, an image conjugate to the first light emission region, and form, at the incident end, a third light emission region substantially conjugate to an exit pupil of the first optical system. The light deflection section is configured to continue to perform an operation that causes a direction in which the bundle of rays is deflected to be continuously changed, and thereby causes the third light emission region to move continuously at the incident end.

In a coherent light source apparatus of an embodiment of the present invention, the second light emission region may be conjugate to the first light emission region.

In a coherent light source apparatus of an embodiment of the present invention, the light mixing section may be a fly eye integrator.

A coherent light source apparatus of an embodiment of the present invention may further include an optical fiber including an incident end to which light derived from the coherent light source is inputted and an emission end, and the first light emission region may be formed by the emission end of the optical fiber.

A projector of an embodiment of the present invention is provided with a coherent light source apparatus, and is configured to project and display an image with use of the coherent light source apparatus. The coherent light source apparatus includes: a coherent light source; a first optical system configured to project light derived from a first light emission region to form a second light emission region, the first light emission region being formed on basis of the coherent light source; a light deflection section configured to deflect a bundle of rays in vicinity of the second light emission region, the bundle of rays being related to formation of the second light emission region; a second optical system provided downstream of the light deflection section; and a light mixing section provided downstream of the second optical system, and configured to mix components of angles and positions of rays incident on an incident end, the light mixing section being configured to serve as a light uniformizing section. The second optical system is configured to form, in distance, an image conjugate to the first light emission region, and form, at the incident end, a third light emission region substantially conjugate to an exit pupil of the first optical system. The light deflection section is configured to continue to perform an operation that causes a direction in which the bundle of rays is deflected to be continuously changed, and thereby causes the third light emission region to move continuously at the incident end.

Effects of the Invention

According to the coherent light source apparatus and the projector of the embodiments of the invention, it is possible to suppress degradation, in uniformity of projected light, resulting from the speckle that occurs upon projection of coherent light.

MODES FOR CARRYING OUT THE INVENTION

Figure 1:
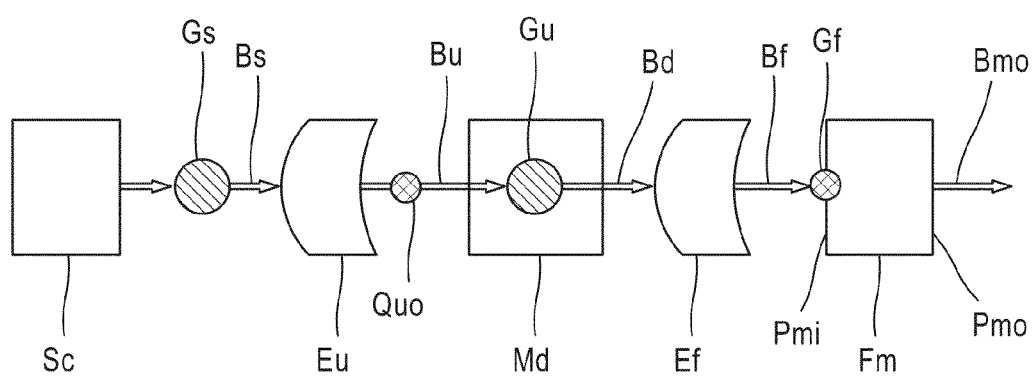
FIG. 1 is a block diagram illustrating, in a simplified manner, a coherent light source apparatus according to an embodiment of the invention.

In description related to the invention, the term "conjugate", for example, when it is described as "A and B are conjugate to each other" as a general term in the field of geometric optics, means that an image of A is formed on B or an image of B is formed on A as a result of a function of an optical device, such as a lens, having an imaging function, at least on the basis of paraxial theory. In this case, A and B are images that obviously encompass an isolated point image as a target, and also encompass, as a target, a set of a plurality of point images as well as an image having an extent in which point images are distributed in a continuous manner.

Here, as a general term in the field of geometric optics, "point image" or "image point" (i.e., "image") encompasses any of: a point that actually emits light therefrom; a point toward which light is converged and that causes a bright point to be shown on a screen when the screen is disposed thereat; a point toward which light is seen as if to be converged (but a screen is not allowed to be disposed thereat because the point is inside an optical system); and a point from which light is seen as if to be emitted (but a screen is not allowed to be disposed thereat because the point is inside an optical system). "Point image" or "image point" (i.e. "image") is used without distinguishing the above-mentioned points one from another. In this case, a phenomenon is neglected that the point image or the image point (i.e., the image) is blurred because of aberration or an off-focus state in imaging, and is prevented from being an ideal point or a diffraction-limited image.

Moreover, "light emission region" is a space or a plane that emits light or that is irradiated with light, and may include the above-described image in some cases. Similarly, "light emission region" encompasses any of: a region that actually emits light therefrom; a region toward which light is converged and that causes a bright region to be shown on a screen when the screen is disposed therein; a region toward which light is seen as if to be converged (but a screen is not allowed to be disposed therein because the region is inside an optical system); and a region from which light is seen as if to be emitted (but a screen is not allowed to be disposed therein because the region is inside an optical system). "Light emission region" is used without distinguishing the above-mentioned regions one from another.

Moreover, "emission point" refers to an image point that configures a light emission region, or a small light emission region that is virtually allowed to be converged close to the diffraction limit.

In a case where the coherent light source (Sc) is a semiconductor laser, when a single semiconductor laser is provided, the first light emission region (Gs) is simply considered a single point light source. The first light emission region (Gs) may be typically disposed on an optical axis of an optical system, or may be disposed in a direction in which a central ray of diverging-direction distribution of divergent light derived from the semiconductor laser coincides with the optical axis. However, when a plurality of semiconductor lasers are provided or when a light source includes emission points that are distributed continuously in finite area, a design needs to be made taking into consideration an entrance pupil and an exit pupil of the optical system and a principal ray. Description is given below concerning such circumstances.

Taking, as an example, a general camera lens in which an aperture stop typically exists inside the lens, an image of the aperture stop viewed through the lens when the lens is viewed from the light entering side is called an entrance pupil, an image of the aperture stop viewed through the lens when the lens is viewed from the light exiting side is called an exit pupil, and a meridional ray that travels toward the center of the entrance pupil or that travels out from the center of the exit pupil is called a principal ray. Further, rays other than the principal ray are called marginal rays in a broad sense.

However, an optical system that uses light having directivity such as laser light has no necessity to extract a bundle of rays by the aperture stop, and may therefore have no aperture stop therein in many cases. In such a case, they are defined depending on an existence form of light in the optical system.

Typically, a central ray of directional distribution of light in a bundle of rays emitted from the emission point is considered the principal ray. The entrance pupil is considered to be located at a position where the principal ray entering the optical system or an extension thereof intersects the optical axis, and the exit pupil is considered to be located at a position where the principal ray exiting the optical system or an extension thereof intersects the optical axis. However, in a precise sense, it is conceivable that the principal ray as defined above and the optical axis do not intersect each other, for example, as a result of adjustment error, and may only be skew in some cases. However, such a phenomenon has no relation to the essence and is worthless to argue. In the description below, it is therefore assumed that such a phenomenon does not occur, or it is assumed that the principal ray and the optical axis intersect each other at a position where the principal ray and the optical axis are closest to each other.

Moreover, when paying attention to two adjacent partial optical systems A and B in the optical system where B is provided immediately downstream of A to be adjacent thereto, an exit pupil of A serves as an entrance pupil of B (in a manner similar to a manner in which an output image of A serves as an input image of B). Further, in the first place, all of the entrance pupils and the exit pupils of arbitrarily-defined partial optical systems in the optical system should be conjugate to one another (all of the entrance pupils and the exit pupils of the arbitrarily-defined partial optical systems are an image of the aperture stop where the aperture stop is provided, or are conjugate to one another even when no aperture stop is provided). For this reason, the entrance pupil and the exit pupil are simply referred to as "pupil" in the absence of the necessity to particularly distinguish one from the other.

In the description of some embodiments of the invention and the drawings, the optical axis of the optical system is referred to as "z axis". However, in a case where the optical axis is bent by a reflector, a direction in which a ray that has been along the original z axis is reflected to travel is also referred to as "z axis", and no coordinate axis is newly provided therefor. It is to be noted that, in the drawings of FIG. 2, etc., axes perpendicular to the z axis are denoted as "x axis" and "y axis" for the sake of convenience.

Figure 2:
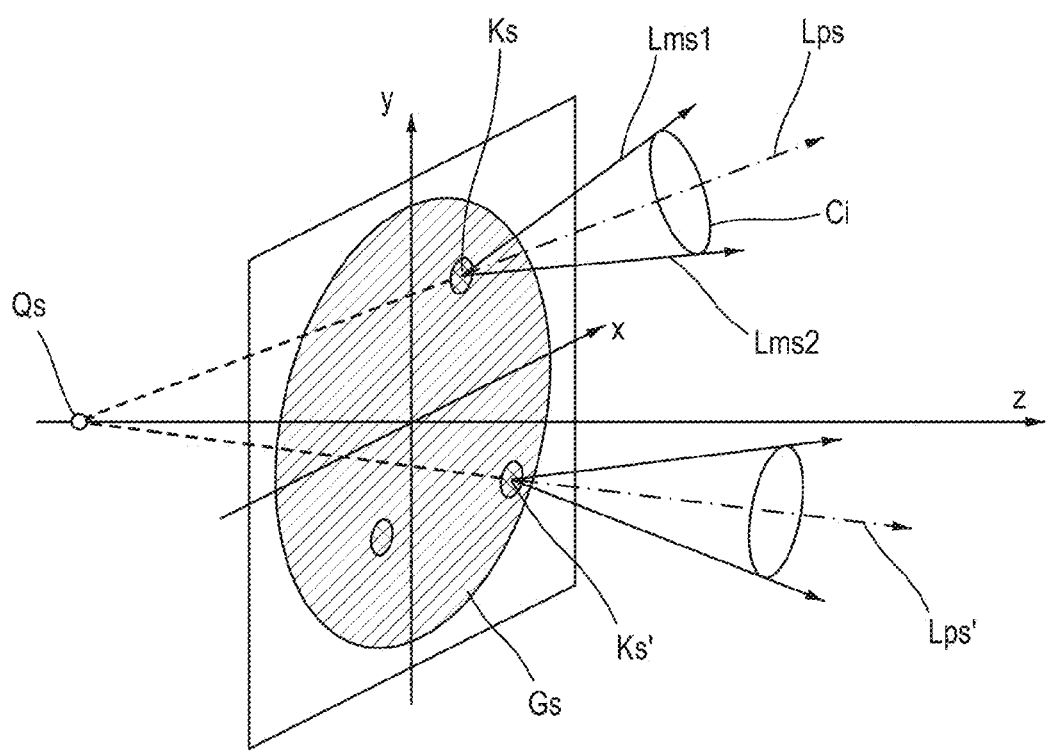
FIG. 2 is a schematic view illustrating, in a simplified manner, part of the coherent light source apparatus according to the embodiment of the invention.
Figure 3:
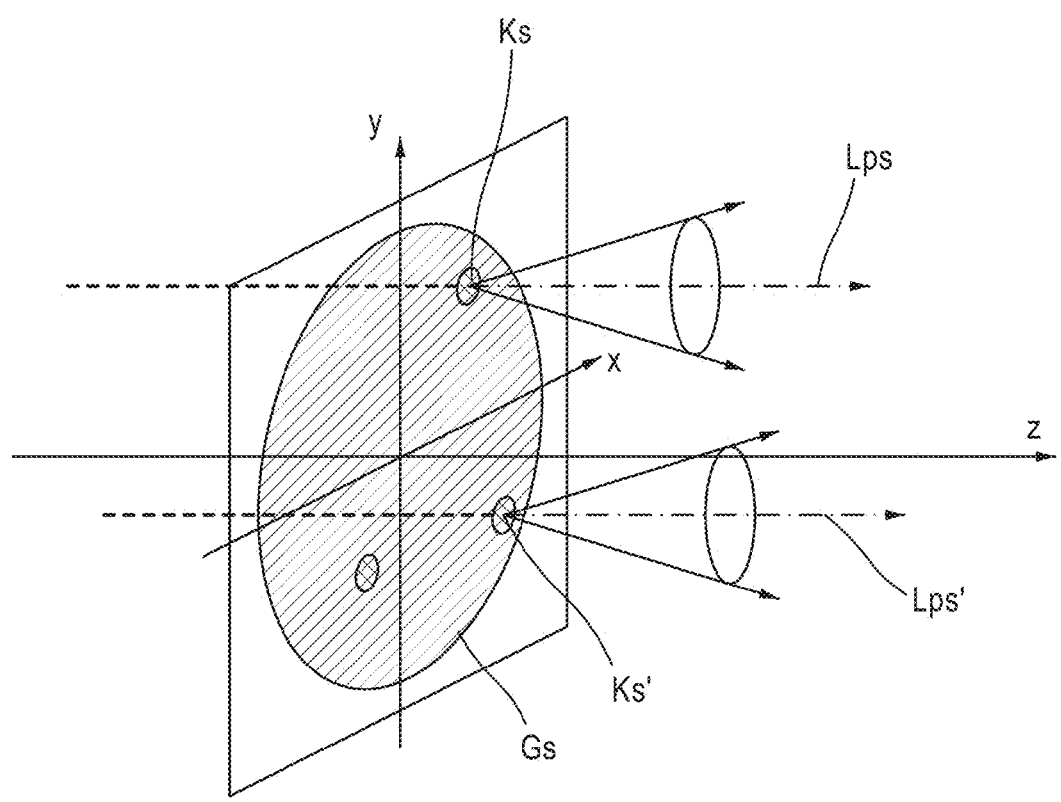
FIG. 3 is a conceptual diagram illustrating, in a simplified manner, part of the coherent light source apparatus according to the embodiment of the invention.

First, an embodiment of the invention is described referring to FIG. 1 which is a block diagram illustrating a coherent light source apparatus according to an embodiment of the invention in a simplified manner, and to FIGS. 2 and 3 which are each a conceptual diagram illustrating part of the coherent light source apparatus according to the embodiment of the invention in a simplified manner. In FIG. 1, for example, in a case where the coherent light source (Sc) is a semiconductor laser, an emission section, of divergent light existing on a surface of a semiconductor chip, that is contained inside a package of the semiconductor laser is allowed to be virtually considered as a point light source, which may be considered the first light emission region (Gs).

FIG. 2 illustrates a state in a case where the first light emission region (Gs) is configured of a plurality of distributed emission points (Ks, Ks', . . . ).

Paying attention to the emission point (Ks), it can be seen that a bundle of rays forming the emission point (Ks) are distributed in a conical angle region defined by a bottom face (Ci), as shown by marginal rays (Lms1 and Lms2) at the outermost. A principal ray (Lps) of the bundle of rays derived from this emission point is defined as a central ray of this distribution of the bundle of rays. In general terms, the principal rays (Lps, Lps', . . . ) each form an angle with respect to the z axis which is the optical axis of the optical system. A pupil is therefore considered to exist at a point (Qs) where the principal rays (Lps, Lps', . . . ) intersect the optical axis. It is to be noted that the pupil is considered to be at the infinite in the case where the principal rays (Lps, Lps', . . . ) are parallel to the optical axis of the optical system as illustrated in FIG. 3.

A first optical system (Eu) configured of a lens and/or the like is so disposed as to receive input of a bundle of rays (Bs) derived from the first light emission region (Gs) and as to form, as a projection region of the first light emission region (Gs), a second light emission region (Gu) in the vicinity of a deflection point of a light deflection section (Md) provided downstream of the first optical system (Eu). In other words, the light deflection section (Md) deflects the bundle of rays (Bu), related to the formation of the second light emission region (Gu), at the deflection point in the vicinity of the second light emission region (Gu).

A second optical system (Ef) configured of a lens and/or the like is so provided as to receive input of the bundle of rays (Bd) that has been deflected by the light deflection section (Md) and form, in the distance, an image conjugate to the first light emission region (Gs), and also as to form a third light emission region (Gf) conjugate to an exit pupil (Quo) of the first optical system (Eu) in the vicinity of an incident end (Pmi) of a light mixing section (Fm) provided downstream of the second optical system (Ef).

It is to be noted that, as described above, that the exit pupil (Quo) of the first optical system (Eu) and the third light emission region (Gf) are conjugate to each other means that the third light emission region (Gf) is formed as an output image formed by an imaging function of the second optical system (Ef) that uses, as an input image, an image of the exit pupil (Quo) inputted via the light deflection section (Md).

Further, the light mixing section (Fm) receives, at the incident end (Pmi) thereof, the bundle of rays (Bf) derived from the second optical system (Ef). Components of angles and positions of the incident rays are mixed inside the light mixing section (Fm), and a bundle of rays (Bmo) is outputted from the emission end (Pmo) of the light mixing section (Fm).

In the bundle of outputted rays (Bmo), multiple interferences are caused by mixing of the components of angles and positions of incident rays. This makes finer a spotty or patchy pattern of a speckle on a surface to be illuminated onto which the bundle of rays (Bmo) is projected, which provides properties that the speckle is made more difficult to be viewed.

The light deflection section (Md) continues to perform an operation of continuously changing a direction in which the bundle of rays (Bu) is deflected, and thereby causes a position of the third light emission region (Gf) at the incident end (Pmi), i.e., a position of ray incident on the incident end (Pmi) to be changed continuously. The speckle derived from the bundle of rays (Bmo) exited from the emission end (Pmo) of the light mixing section (Fm) thus moves constantly. As a result, when being averaged in a period appropriate for the speed of the movement, the spotty or patchy pattern of the speckle described above is made finer. Synergistically combined with the effect of making the speckle more difficult to be viewed, this allows the speckle to be seen as being disappeared.

One reason why the third light emission region (Gf) formed at the incident end (Pmi) is made a region conjugate to the exit pupil (Quo) of the first optical system (Eu) is because principal rays are collected at the center of the region at the exit pupil (Quo), and the exit pupil (Quo) serving as a region through which all of the light outputted from the first optical system (Eu) passes becomes a compact region, which in turn causes the third light emission region (Gf) to be compact when the third light emission region (Gf) is made a region conjugate to the exit pupil (Quo). Now, assuming a case where the incident end (Pmi) of the light mixing section (Fm) has a predetermined size, causing the third light emission region (Gf) to be compact increases a relative change amount of position of the third light emission region (Gf) at the incident end (Pmi). This accelerates mixing of the components of angles and positions of light in the bundle of rays (Bmo) exited from the emission end (Pmo) of the light mixing section (Fm), and makes the speckle more difficult to be viewed consequently. Or in reverse, when the necessary intensity of the mixing of the components of angles and positions of light is determined, the size of the incident end (Pmi) is allowed to be reduced more as the third light emission region (Gf) is more compact. It is thus possible to reduce the size of the light mixing section (Fm).

Incidentally, supplementary description is provided below of precision of the third light emission region (Gf) being conjugate to the exit pupil (Quo). A position at which a region conjugate to the exit pupil (Quo) is formed may be shifted forward or backward compared to the incident end (Pmi) of the light mixing section (Fm) as a reference. However, this causes no problem in a case where the incident end (Pmi) does not spread out due to increase in the third light emission region (Gf) caused by the shifting, or in a case where decrease in efficiency in utilizing light caused by the shifting is within an acceptable limit even when spreading out at the incident end (Pmi) occurs.

It is to be noted that, in FIG. 1, the exit pupil (Quo) of the first optical system (Eu) is illustrated at a backward position of the first optical system (Eu) for the sake of convenience. However, for example, the exit pupil (Quo) of the first optical system (Eu) may be a virtual image and may be formed to have a geometric-optical position inside the first optical system (Eu) or at a forward position of the first optical system (Eu).

Moreover, in FIG. 1, the exit pupil (Quo) is illustrated at a forward position of the second light emission region (Gu). However, the exit pupil (Quo) may be formed at a backward position of the second light emission region (Gu).

Moreover, the first optical system (Eu) may be preferably configured so that the second light emission region (Gu) formed in the vicinity of the deflection point of the light deflection section (Md) is conjugate to the first light emission region (Gs).

A first reason for this is because the first light emission region (Gs) is a compact region that serves as a region through which all of the light inputted into the first optical system (Eu) passes, and the second light emission region (Gu) is therefore also made compact by allowing the second light emission region (Gu) to be a region conjugate to the first light emission region (Gs). This makes it also possible to allow the size, of the light deflection section (Md), necessary for deflecting the bundle of rays (Bu) to be compact.

It is to be noted that, although it has been described previously that the exit pupil (Quo) is a compact region, the exit pupil (Quo) is not allowed to be utilized as the second light emission region (Gu).

One reason for this is as follows. As described above, the second optical system (Ef) is provided so as to form the third light emission region (Gf) conjugate to the exit pupil (Quo) of the first optical system (Eu) in the vicinity of the incident end (Pmi) of the light mixing section (Fm). Accordingly, if the exit pupil (Quo) is arranged, as the second light emission region (Gu), in the vicinity of the deflection point of the light deflection section (Md), the position, of the third light emission region (Gf), at the incident end (Pmi) is not allowed to be changed even if the light deflection section (Md) changes the direction in which the bundle of rays (Bu) is deflected.

A second reason is as follows. Because the second light emission region (Gu) is conjugate to the first light emission region (Gs), the image in the distance formed by the second optical system (Ef) is conjugate also to the second light emission region (Gu). However, the second light emission region (Gu) is disposed in the vicinity of the light deflection section (Md), and the second light emission region (Gu) is therefore kept in an almost-unmovable state even when the light deflection section (Md) performs the deflection operation, which in turn keeps the image in the distance formed by the second optical system (Ef) to be in an almost-unmovable state.

This property is utilizable in causing the coherent light source apparatus to operate while keeping high efficiency, of the light mixing section (Fm), in utilizing light, as described later.

Incidentally, various members may be used as the light mixing section (Fm) as long as the components of angles and positions of the incident rays are mixed to exit therefrom upon incidence of light. In particular, as a simple member, an optical guide may be used that encloses light in a predetermined space and guides the enclosed light while performing multiple reflection thereon.

Figure 15:
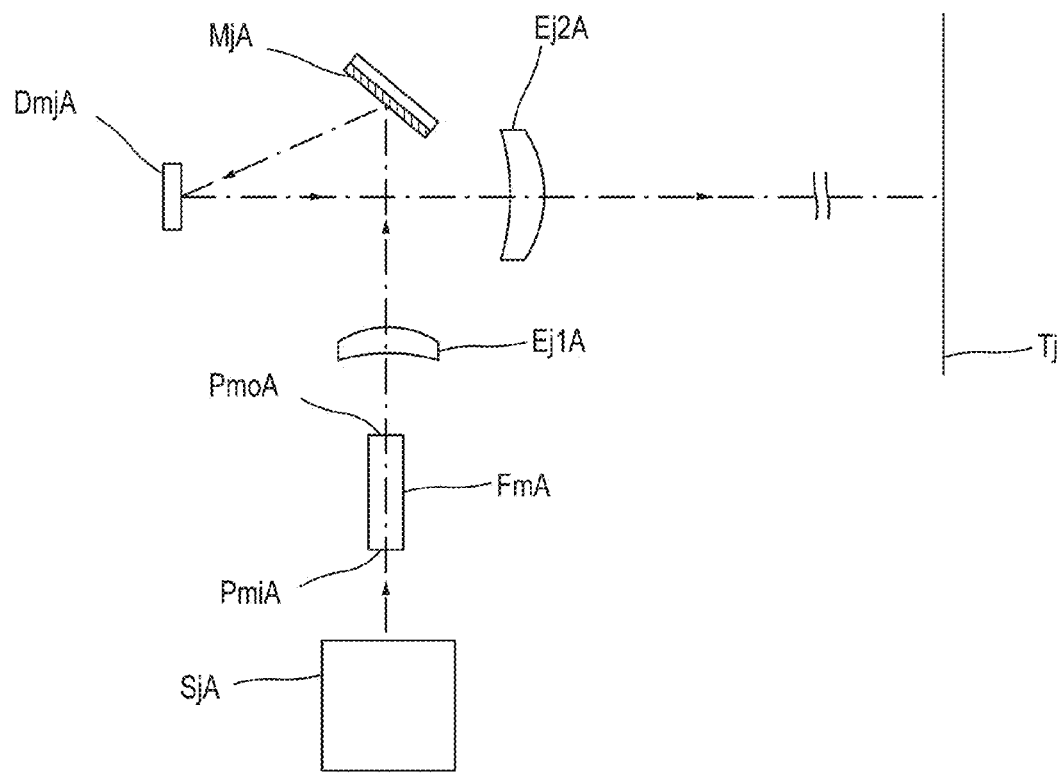
FIG. 15 is a principle diagram for explaining one mode of part of a kind of an existing projector related to a projector according to an embodiment of the invention.

Such an optical guide is also called by names such as a rod integrator and a light tunnel, and may be configured of a rectangular cylinder made of a light transmissive material such as glass or resin, as described above referring to FIG. 15. The light inputted to the incident end (Pmi) propagates inside the light mixing section (Fm) while being totally reflected by the side faces of the light mixing section (Fm) repeatedly on the basis of a principle same as that of the optical fiber. This causes mixing of components of angles and positions of the incident rays to be performed.

Also, as described above, the optical guide described previously may be an optical guide configured of a hollow square tube that has inner faces configured of reflectors and causes light to propagate therein while being reflected repeatedly by the inner faces, which thereby achieves a similar function, other than the optical guide configured of a rectangular cylinder made of a light transmissive material such as glass or resin.

It is to be noted that the following is one reason why the components of angles and positions of the incident rays are mixed by thus enclosing the light in the predetermined space and performing multiple reflection thereon to guide the enclosed light. When the light propagates under repeated multiple reflection through the entire length of the light mixing section (Fm), an extremely-large number of wave sources should be seen on the basis of a principle of kaleidoscope, when viewed in from the emission end (Pmo). This achieves a state equivalent to a state in which the light derived from the extremely-large number of wave sources reaches the emission end (Pmo) to exit therefrom.

Alternatively, as the light mixing section (Fm), a fly eye integrator similar to that described above referring to FIG. 16 may be used. One reason why the components of angles and positions of the incident rays are mixed with the use of the fly eye integrator is as follows. As described above, all of the quadrangular images of the outer shapes of the respective lenses arranged in a matrix on the fly eye lens on the incident side are overlapped to be a single image, which achieves a kaleidoscope-like state. Accordingly, the light derived from the extremely-large number of wave sources reaches the illumination target at the same time.

Figure 4:
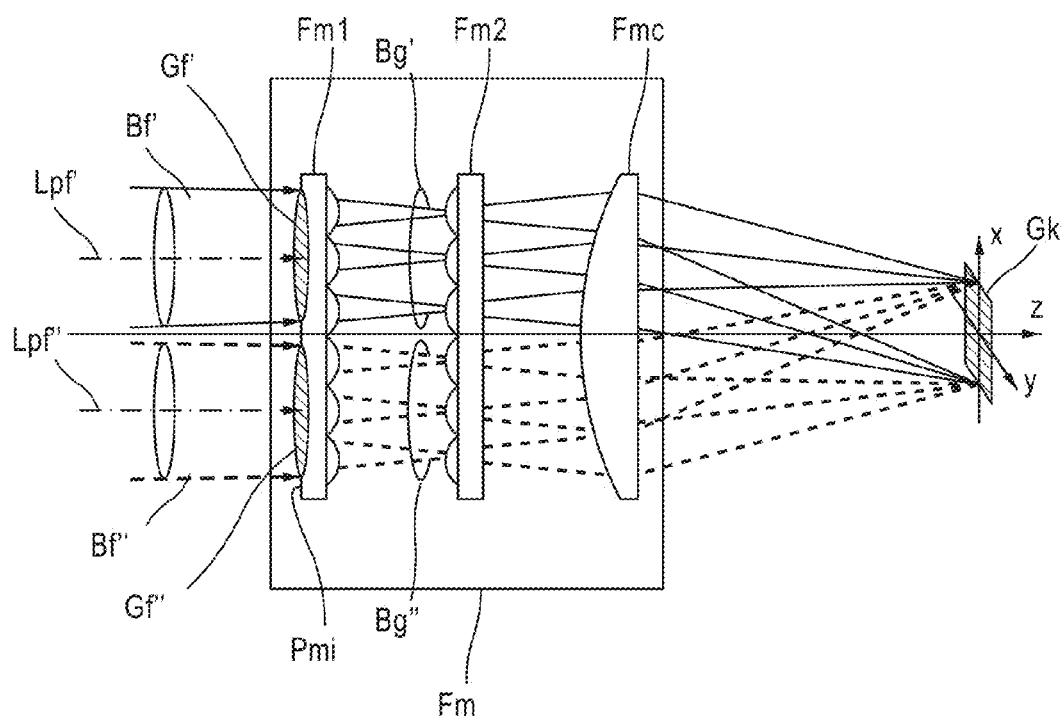
FIG. 4 is a conceptual diagram illustrating, in a simplified manner, part of the coherent light source apparatus according to the embodiment of the invention.

FIG. 4 illustrates a state in a case where the fly eye integrator is used as the light mixing section (Fm) of the coherent light source apparatus according to the embodiment of the invention.

As with the fly eye integrator described above referring to FIG. 16, in this fly eye integrator, rectangular images of outer shapes of respective lenses arranged in a matrix on an upstream fly eye lens (Fm1) on the incident side are formed into an illumination region (Gk) as a single image of synthesized quadrangles by a downstream fly eye lens (Fm2) on the emission side and an illumination lens (Fmc).

When the third light emission region (Gf) is located at a position of a region (Gf) in FIG. 4, a bundle of rays (Bf) forming the region (Gf) is applied onto part of the upstream fly eye lens (Fm1), and generates a partial bundle-of-ray group (Bg') to form the illumination region (Gk).

Further, when the third light emission region (Gf) is brought to a position of a region (Gf″) as illustrated by a dashed line in response to the continuous change, made by the light deflection section (Md), on the direction in which the bundle of rays (Bu) is deflected, a bundle of rays (Bf″) forming the region (Gf″) is applied onto another part of the upstream fly eye lens (Fm1), and generates a partial bundle-of-ray group (Bg") that is different from the partial bundle-of-ray group (Bg'), thereby forming the illumination region (Gk) as well.

As described above, when forming the illumination region (Gk), used part of the upstream fly eye lens (Fm1) is continuously changed through the operation of the light deflection section (Md), and angles of rays at the time of forming the illumination region (Gk) are thereby continuously changed. As a result, the speckle moves constantly. This makes finer the above-described spotty or patchy pattern of the speckle when being averaged in a period appropriate for the speed of the movement, which makes the speckle more difficult to be viewed.

It is to be noted that, for the sake of easier understanding based on the function principle of the fly eye integrator described above referring to FIG. 16, the image in the distance that is formed by the second optical system (Ef) and is conjugate to the second light emission region (Gu) may be desirably and ideally an image at the infinite.

Moreover, for the sake of easier understanding based on the function principle of the fly eye integrator as well, at all of the positions of the third light emission region (Gf) that are continuously changed through the operation of the light deflection section (Md), the principal ray from the central image point of the first light emission region (Gs) included in the bundle of rays (Bf) forming the third light emission region (Gf) may be desirably kept as parallel as possible to an axis, that is the z axis, of the fly eye integrator, i.e., of the light mixing section (Fm). Examples of such a principal ray may include a principal ray (Lpf') from the central image point of the first light emission region (Gs) included in the bundle of rays (Bf'), and a principal ray (Lpf") from the central image point of the first light emission region (Gs) included in the bundle of rays (Bf").

When a distance, from the infinite, to the image that is formed by the second optical system (Ef) and is conjugate to the second light emission region (Gu) is increased, or when a deviation, of the principal ray from the central image point of the first light emission region (Gs) included in the bundle of rays (Bf), from being parallel to the axis of the light mixing section (Fm) is increased, rays that are incapable of contributing to the formation of the illumination region (Gk) are increased; in other words, efficiency in utilizing light is decreased. For this reason, the above-described distance and deviation may be suppressed to an extent that allows the decrease in efficiency in utilizing light to be within an acceptable limit.

It is to be noted that one reason why attention is paid here to the central image point of the first light emission region (Gs) is as follows. The third light emission region (Gf) conjugate to the exit pupil (Quo) of the first optical system (Eu) is formed in the vicinity of the incident end (Pmi) of the light mixing section (Fm) located at a finite distance (which is not at the infinite). Such a third light emission region (Gf) corresponds to the exit pupil of the second optical system (Ef). Consequently, it is not possible to cause all of the principal rays to be parallel. For this reason, it is favorable to suppress insufficiency with respect to the ideal parallel state to be small as a whole by determining a representative image point thereamong and causing light rays from the determined representative image point to be parallel to the z axis. Attention has been paid to the above-mentioned central image point of the first light emission region (Gs) as the representative image point therefor, and the central image point is therefore not necessarily at the center in a precise sense.

Figure 11A:
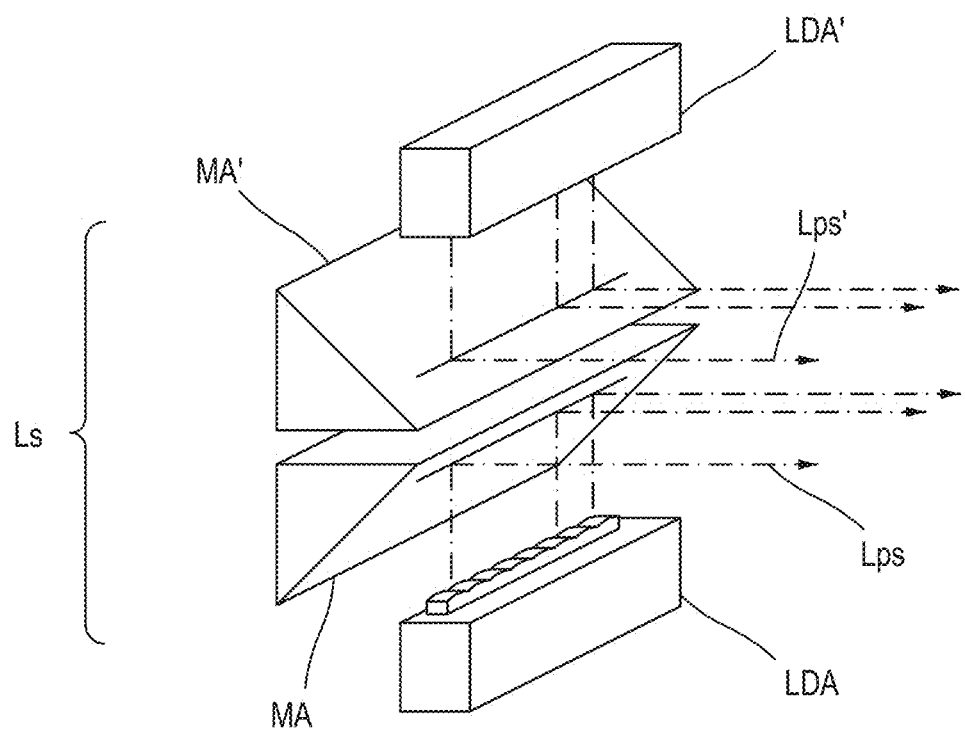
FIG. 11A and FIG. 11B are conceptual diagrams illustrating, in a simplified manner, one mode of part of the embodiment of the coherent light source apparatus of the invention.
Figure 11B:
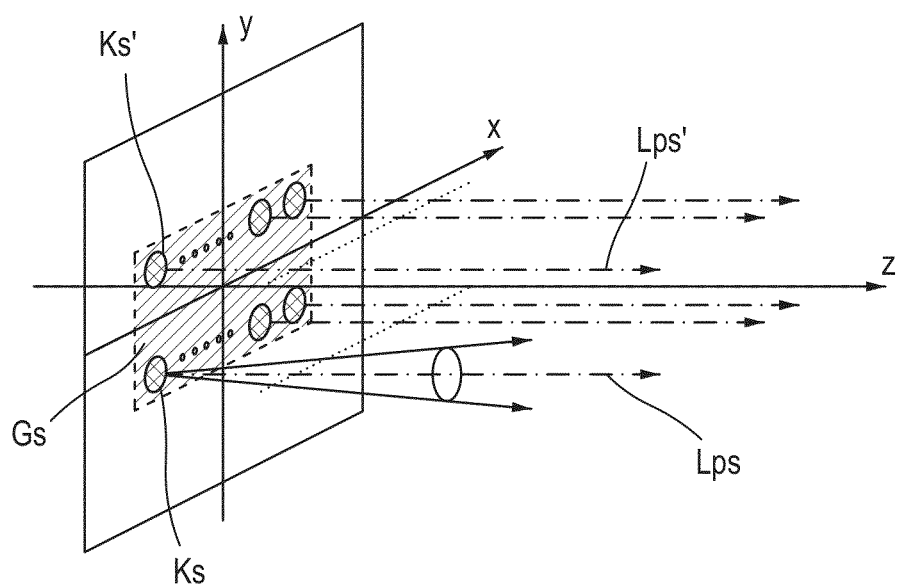

As with the first light emission region (Gs) illustrated in (b) of FIG. 11 described later, when an emission point does not exist in the center, a virtual image point may be the representative point. Alternatively, attention may be paid to one of the emission points (Ks, Ks', . . . ) that actually exist near the center.

Figure 5:
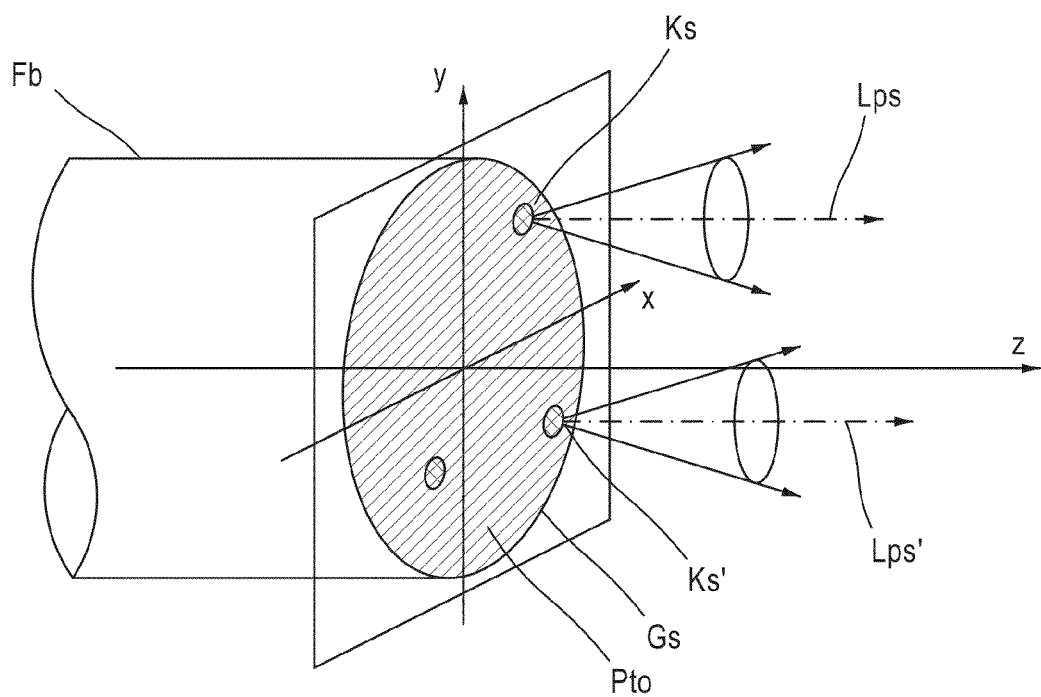
FIG. 5 is a conceptual diagram illustrating, in a simplified manner, part of the coherent light source apparatus according to the embodiment of the invention.
Figure 6:
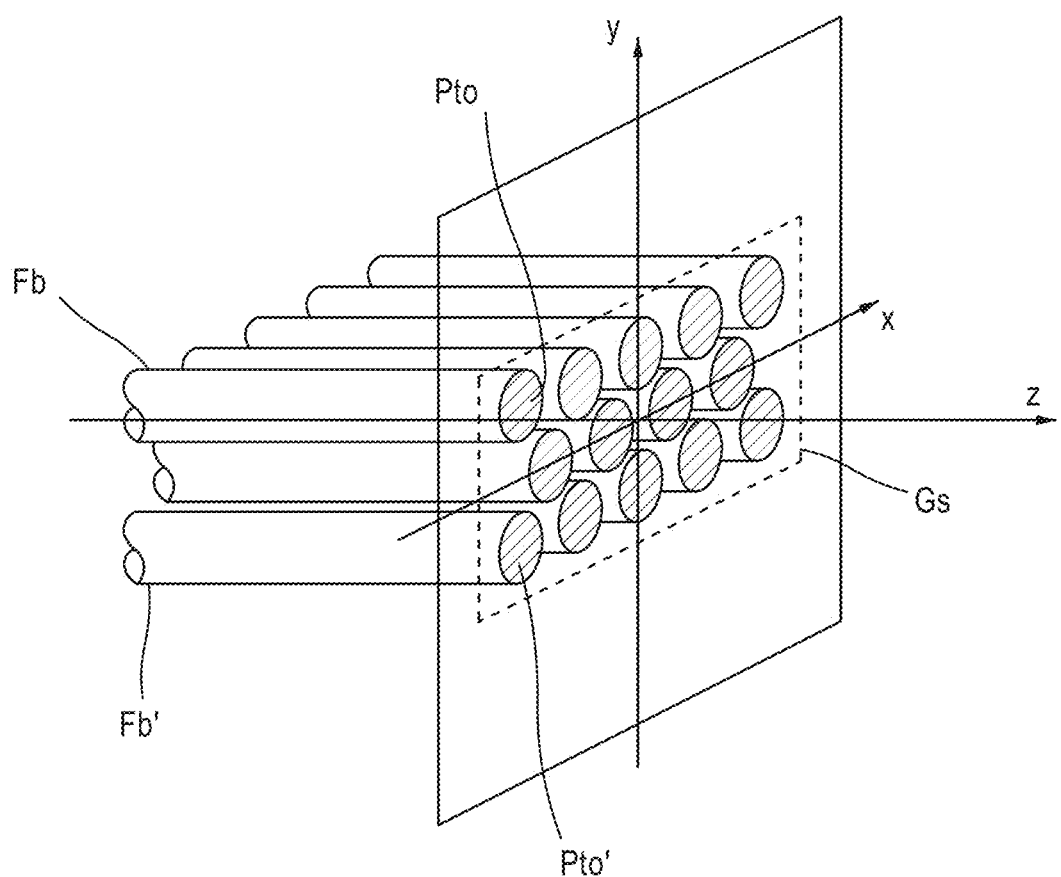
FIG. 6 is a conceptual diagram illustrating, in a simplified manner, part of the coherent light source apparatus according to the embodiment of the invention.

An embodiment of the invention is described referring to FIGS. 5 and 6 that are each a conceptual diagram illustrating, in a simplified manner, part of the coherent light source apparatus according to the embodiment of the invention.

It has been described above that the emission section of the divergent light that exists on the surface of the semiconductor chip is considered the first light emission region (Gs) in a case where the coherent light source (Sc) is, for example, a semiconductor laser. Further, description has been given of a preferred embodiment of the present invention preferable in a case where a plurality of semiconductor lasers are used.

Not only such a primary light source that actually generates light, but also a secondary light source that emits light by receiving light sent from the primary light source or by receiving light projected therefrom may be used as the first light emission region (Gs).

As an example thereof, the first light emission region (Gs) may be formed of an emission end (Pto) of an optical fiber (Fb) that has an incident end into which the light derived from the coherent light source (Sc) is inputted. As illustrated in FIG. 5, a core, on the emission side of the optical fiber, as a whole may serve as the first light emission region (Gs).

In this case, even when a single optical fiber is used, typically, the optical fiber is not allowed to be considered a point light source, and the first light emission region (Gs) has to be considered a light emission region in which emission points are continuously distributed in finite area. In other words, emission points (Ks, Ks', . . . ) are continuously distributed in an almost-uniform manner at the emission end (Pto) that is the core of the optical fiber, and the light is emitted from a vertex angle, in a conical angle region, of each of the emission points (Ks, Ks', . . . ), that is defined depending on a structure of the optical fiber and includes marginal rays existing therein in a distributed manner.

In this case, the principal rays (Lps, Lps', . . . ) are parallel to an axis of the optical fiber. Hence, it is enough that the axis of the optical fiber coincides with the z axis which is the optical axis of the optical system. This achieves a circumstance same as that described above referring to FIG. 3.

As illustrated in FIG. 6, in a case where a plurality of optical fibers (Fb, Fb', . . . ) are used, the plurality of optical fibers (Fb, Fb', . . . ) may be so arranged that axes of all of the optical fibers are parallel to the z axis which is the optical axis of the optical system, and that emission ends (Pto, Pto', . . . ) of all of the optical fibers (Fb, Fb', . . . ) are located on a single plane. In this case, a region formed of the emission ends (Pto, Pto', . . . ) as a whole serves as the first light emission region (Gs).

It is to be noted that FIGS. 5 and 6 only illustrate cores of the optical fibers, and illustration of clads, a structure for holding the emission ends (Pto, Pto', . . . ) at predetermined positions (particularly, in the case of using the plurality of optical fibers), a cable coating, etc. is omitted.

It is advantageous to use the optical fiber in the coherent light source apparatus according to the embodiment of the invention in that freedom in arrangement of an application apparatus is increased, or repairing upon trouble and component replacement become easier, by separating a portion generating light and a portion utilizing light from each other and connecting the separated portions with a flexible cable.

In addition thereto, it is advantageous in that the optical fiber itself has a function of serving as the light mixing section. Specifically, a structure may be adopted in which the light of the primary light source, such as a semiconductor laser, that originally includes no speckle is transmitted through the optical fiber to be converted into a secondary light source having finer speckle, which is further transmitted through the light mixing section (Fm). This makes finer the spotty or patchy pattern of the speckle, which improves the effect of making the speckle more difficult to be viewed.

As described above, a light uniformizing section such as the optical guide or the fly eye integrator is an essential component in a projector that utilizes a kind of light source, such as an existing high intensity discharge lamp, to project and display an image. Such a light uniformizing section is allowed to serve as the light mixing section (Fm) which is the component of the embodiment of the present invention, in order to avoid the issue of degradation in uniformity of projected light caused by the speckle, as described above. It is therefore possible to reduce the cost by adopting a configuration in which the light uniformizing section serves as the light mixing section (Fm) when achieving a projector that utilizes the coherent light source apparatus according to the embodiment of the invention as a light source to project and display an image.

As described above, the existing projector may display a color image as follows. For example, a dynamic color filter such as a color wheel may be disposed upstream of the light uniformizing section to illuminate the two-dimensional light amplitude modulation device with a bundle of color-sequential rays of R, G, and B (red, green, and blue). Color display is thus achieved in a time-divisional manner. Alternatively, a dichroic mirror, a dichroic prism, or the like may be arranged downstream of the light uniformizing section to illuminate the two-dimensional light amplitude modulation devices provided independently for the respective colors with light having gone through color separation into three primary colors of R, G, and B, and a dichroic mirror, a dichroic prism, or the like may be disposed for performing color synthesis on the bundle of modulated rays of the three primary colors of R, G, and B.

An projector according to an embodiment of the invention also needs light sources having necessary kinds of color phases. For example, coherent light sources of three primary colors of R, G, and B may be used. The coherent light sources of the three primary colors of R, G, and B may be subjected to color synthesis to form the first light emission region (Gs) of white. The white light is caused to enter the light mixing section (Fm) that serves as the light uniformizing section via the first optical system (Eu), the light deflection section (Md), and the second optical system (Ef), as described above. Further, as with the existing projector, the time-divisional process with the use of the dynamic color filter, or color separation and color synthesis may be performed downstream of the light mixing section (Fm).

It is to be noted that, in a case of using the above-described optical fibers as illustrated in FIG. 6, the emission ends (Pto, Pto', . . . ) of the optical fibers that have incident ends which different colors of light rays enter may be bundled together upon formation of the color-synthesized first light emission region (Gs). This allows the first light emission region (Gs) to include parts having a plurality of colors. Alternatively, the first light emission regions (Gs) each having a single color may be formed for respective colors, which may be overlapped with one another with the use of color synthesis section such as a dichroic mirror to send light to the first optical system (Eu). This forms the color-synthesized first light emission region (Gs) as a result. It is to be noted that, when viewing the color synthesizing section side from the first optical system (Eu) side, a single first light emission region (Gs) having a plurality of colors is viewed. In the field of optics, this state is considered to have achieved formation of the color-synthesized first light emission region (Gs).

Alternatively, formation of the first light emission region (Gs) and light application onto the two-dimensional light amplitude modulation device via the first optical system (Eu), the light deflection section (Md), the second optical system (Ef), and the light mixing section (Fm) serving as the light uniformizing section may be performed separately for respective colors to form single-color images, which may be then subjected to color synthesis.

Alternatively, the coherent light sources may be driven in a time-divisional manner, for example, in order of R, G, and B to form the color-sequential first light emission region (Gs), and the two-dimensional light amplitude modulation device may be illuminated therewith via the first optical system (Eu), the light deflection section (Md), the second optical system (Ef), and the light mixing section (Fm) serving as the light uniformizing section. This allows generation of color-sequential color images.

Description is given below of more specific configurations of embodiments of the invention, with reference to the drawings.

Figure 7:
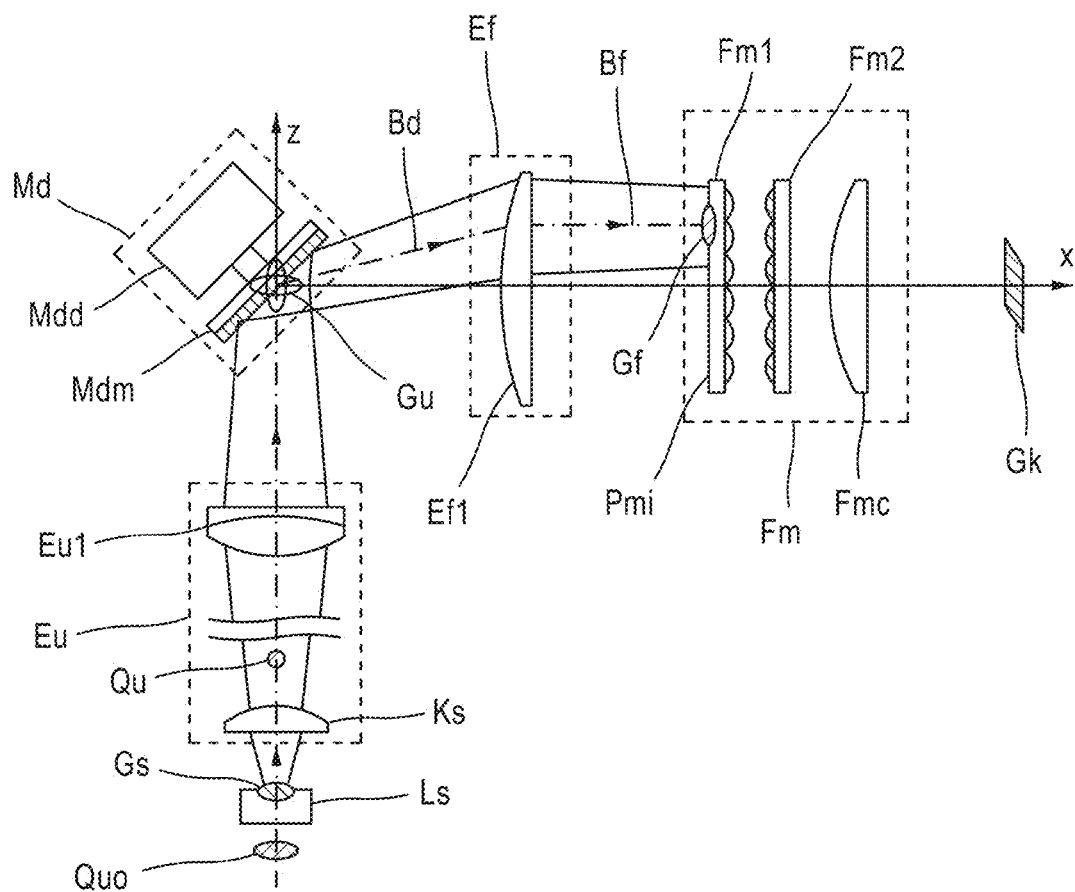
FIG. 7 is a diagram illustrating, in a simplified manner, one mode of an embodiment of the coherent light source apparatus of the invention.

First, description is given of a coherent light source apparatus illustrated in FIG. 7. It is assumed that an emission section of divergent light that exists on a surface of a semiconductor chip in a semiconductor laser light source unit (Ls) including one or a plurality of semiconductor lasers as light sources is the first light emission region (Gs).

A first optical system (Eu) includes a collimator lens (Es) that converts light from the first light emission region (Gs) into an image at the infinite, and an imaging lens (Eu1). The first optical system (Eu) forms, on a deflection mirror (Mdm), an image of the second light emission region (Gu) as an image conjugate to the first light emission region (Gs).

It is to be noted that, in the case where the semiconductor laser light source unit (Ls) includes a plurality of semiconductor lasers as light sources, here, all of principal rays from the first light emission region (Gs) are basically considered to be parallel to the optical axis. However, even when not all of the principal rays is parallel to the optical axis, an optical system having a similar function is achievable by designing the optical system in control of a position of image plane on the optical system and of positions of pupils.

In the previously-described case where all of the principal rays from the first light emission region (Gs) are parallel to the optical axis, an exit pupil (Qu) of the collimator lens (Es) is formed at an output-side focal point of the collimator lens (Es). An exit pupil (Quo) of the first optical system (Eu) is therefore formed as an image by the imaging lens (Eu1) with respect to the exit pupil (Qu) of the collimator lens (Es).

The image of the first light emission region (Gs) inputted to the imaging lens (Eu1) is at the infinite as described above. An output image thereof, i.e., the second light emission region (Gu) is therefore formed on an output-side focal surface of the imaging lens (Eu1).

Here, a case is assumed in which the exit pupil (Qu) of the collimator lens (Es) is arranged at a position closer to the imaging lens (Eu1) than the output-side focal surface of the imaging lens (Eu1) is, and the exit pupil (Quo) of the first optical system (Eu) is therefore formed, as a virtual image of the imaging lens (Eu1), at a backward position of the imaging lens (Eu1).

The deflection mirror (Mdm) may have, for example, a circular shape. The deflection mirror (Mdm) is attached to a rotational shaft of a mirror rotation motor (Mdd) to be rotated thereby. The deflection mirror (Mdm) is so attached to the rotational shaft that a normal vector to a reflection surface of the deflection mirror (Mdm) is inclined at a predetermined angle with respect to the rotational shaft.

Such a structure allows the normal vector to sway to have a locus forming a lateral surface of a cone in accordance with the rotation of the mirror rotation motor (Mdd). The deflection mirror (Mdm) thus serves a rotation swaying mirror, and functions as the light deflection section (Md).

The bundle of rays (Bd) deflected by the light deflection section (Md) enters the second optical system (Ef) configured of a collimator lens (Ef1). This second optical system (Ef) forms an output image at the infinite as an image conjugate to the second light emission region (Gu) on the deflection mirror (Mdm), and also forms a third light emission region (Gf), as an image conjugate to the exit pupil (Quo) of the first optical system (Eu), at an incident end (Pmi) of a light mixing section (Fm) configured of a fly eye integrator that is provided downstream of the second optical system (Ef).

It is to be noted that, here, a configuration is adopted that causes the second light emission region (Gu) to be conjugate to the first light emission region (Gs). The arrangement may be therefore made so that the input-side focal point of the second optical system (Ef) coincide with the second light emission region (Gu) in order to cause the second optical system (Ef) to form an output image at the infinite.

In this case, the second light emission region (Gu) is located on the deflection mirror (Mdm), and is therefore kept to have an almost-unmovable state even when the deflection operation of the light deflection section (Md) is performed. As a result, a position of the output image at the infinite formed by the second optical system (Ef), i.e., an angle with respect to the z axis is kept almost constant.

Accordingly, it is understandable that, when the optical systems are appropriately adjusted at first, an optical system is achieved in which the principal ray from the central image point of the first light emission region (Gs) included in the bundle of rays (Bf) forming the third light emission region (Gf) is allowed to be kept parallel to the z axis in all of the positions of the third light emission region (Gf) that are continuously changed by the operation of the light deflection section (Md) as described above referring to FIG. 4.

Figure 8:
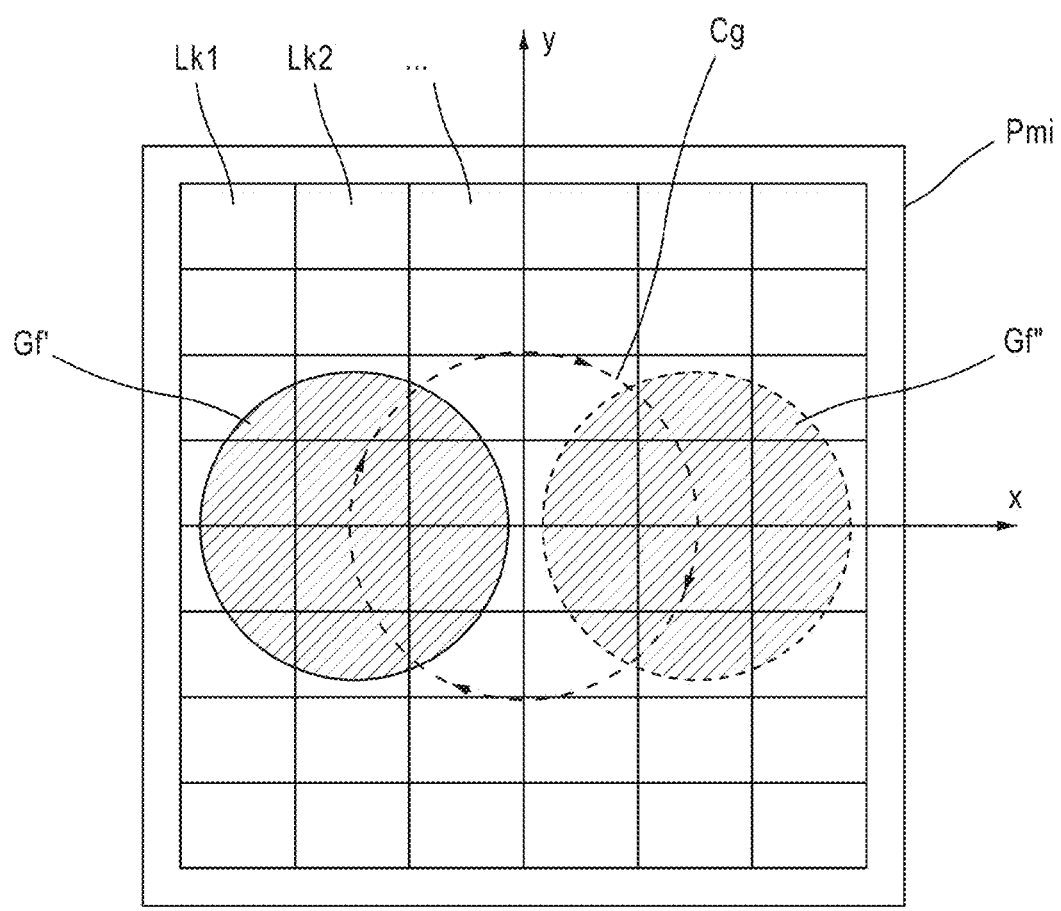
FIG. 8 is a conceptual diagram illustrating, in a simplified manner, one mode of part of the embodiment of the coherent light source apparatus of the invention.

FIG. 8 is a conceptual diagram illustrating the light mixing section (Fm) configured of the fly eye integrator as viewed from the front. This light mixing section (Fm) includes a number of Köhler illumination upstream lenses (Lk1, Lk2, . . . ) described above referring to FIG. 16 that are arranged in a matrix.

A state is illustrated, that, in the case where the rotation swaying mirror is used as the light deflection section (Md), the third light emission region (Gf) formed at the incident end (Pmi) of the light mixing section (Fm) is displaced in response to the change in the deflection direction caused by the light deflection section (Md). The center of the third light emission region (Gf) moves to form a circular locus (Cg).

Incidentally, a region (Gf') and a region (Gf'') are illustrated in correspondence with the regions, described above referring to FIG. 4, that are denoted by the same reference signs.

The semiconductor laser light source unit (Ls) including a plurality of semiconductor lasers has been referred above, achievement of which is described briefly below.

Figure 9:
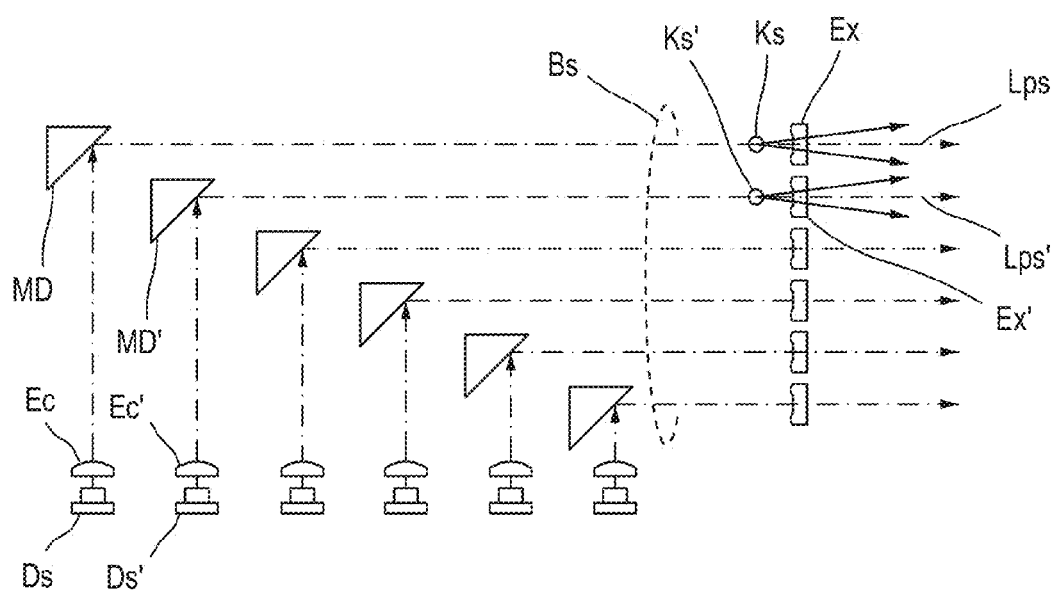
FIG. 9 is a conceptual diagram illustrating, in a simplified manner, one mode of part of the embodiment of the coherent light source apparatus of the invention.

As illustrated in FIG. 9, the necessary number of discrete semiconductor laser light sources (Ds, Ds', . . . ) that each contain a semiconductor laser having a single emission point are arranged in a metal case having a window made of sapphire. Collimator lenses (Ec, Ec', . . . ) are disposed corresponding to the respective discrete semiconductor laser light sources (Ds, Ds', . . . ). The divergent light derived from each of the semiconductor lasers is thereby converted into a parallel beam, i.e., an infinite image point. The parallel beams are formed, with the use of beam synthesis mirrors (MD, MD', . . . ), into a series of beams (Ba) that has a desired spacing in beam arrangement, following which the series of beams (Ba) is converted into emission points (Ks, Ks', . . . ) at a finite distance with the use of divergent lenses (Ex, Ex', . . . ) that are arrayed in correspondence with the number of the beams. As a result, principal rays (Lps, Lps', . . . ) from the emission points (Ks, Ks', . . . ) are made almost parallel to one another, which achieves the circumstance illustrated in FIG. 3 and described above.

Accordingly, the emission points (Ks, Ks', . . . ) illustrated in FIG. 9 may be preferably used as the semiconductor laser light source unit (Ls) illustrated in FIG. 7.

Figure 10A:
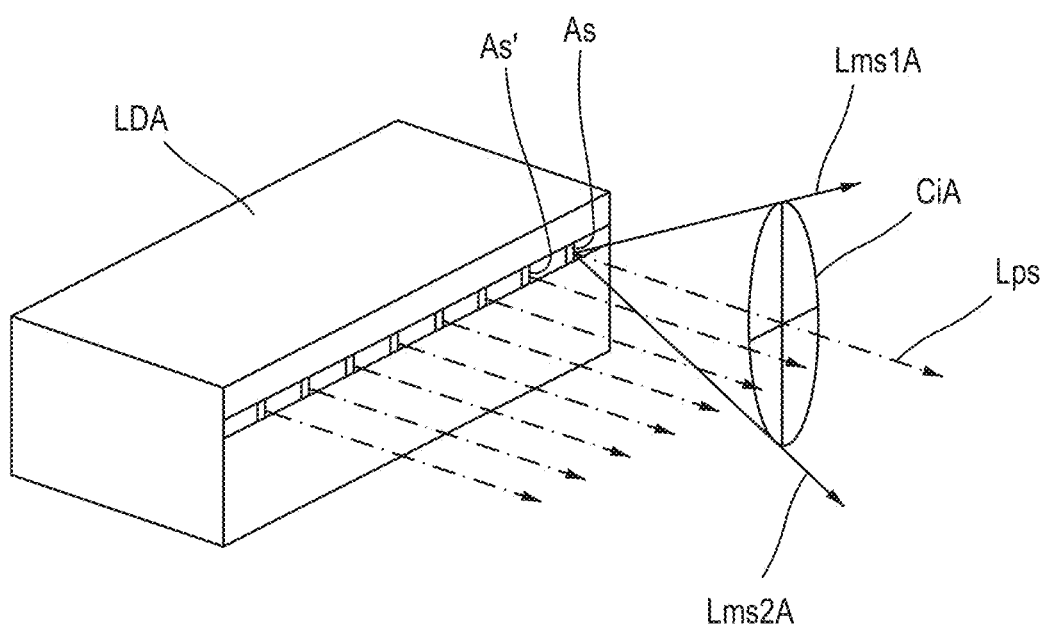
FIG. 10A and FIG. 10B are schematic views illustrating, in a simplified manner, one mode of a member related to the coherent light source apparatus of the invention.

A semiconductor laser array device (LDA), conceptual diagram of which is illustrated in FIG. 10A, is also applicable to the coherent light source apparatus according to the embodiment of the invention, other than the above-described discrete semiconductor laser light sources. The semiconductor laser array device (LDA) has an end face including semiconductor laser active regions (As, As', . . . ) that are arrayed thereon in a line. Divergent light is emitted from each of the semiconductor laser active regions (As, As', . . . ). Both of the discrete type and the array type have the following characteristics. An divergent angle of the bundle of rays emitted from the semiconductor laser of an end-face emission type is increased under the influence of diffraction phenomenon. Also, a divergent angle in a direction perpendicular to the substrate surface (of the semiconductor chip in the semiconductor laser) is particularly large as can be seen from the marginal rays (Lms1A and Lms2A). In other words, the bottom face (CiA) of the cone that represents an emission angle range is not circle but far ellipsoid.

A collimator lens is used for converting this bundle of emitted rays into parallel beams. It is necessary to use a collimator lens having a short focal length depending on the component, in a direction perpendicular to the substrate, that has a large divergent angle. The use of such a collimator lens causes no significant problem in the case of the discrete semiconductor laser unless flat beam is favorable. However, in the case of the arrayed semiconductor laser, when attempting to convert all of the bundles of emitted rays from the semiconductor laser active regions (As, As', . . . ) into parallel beams by a single collimator lens, the shortness of the focal length of the collimator lens causes an issue that the respective principal rays from the semiconductor laser active regions (As, As', . . . ) form large angles with respect to one another.

Figure 10B:
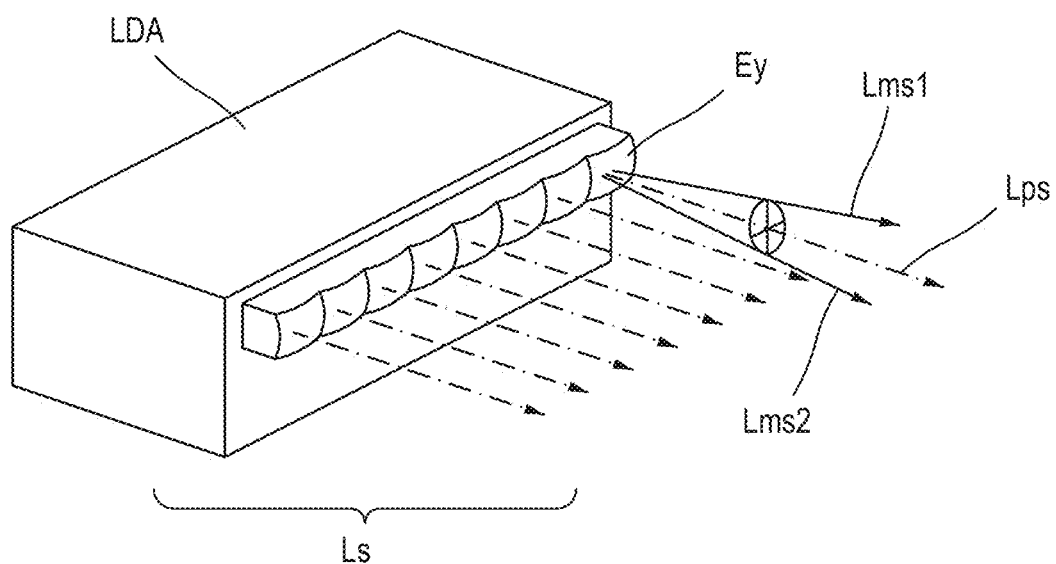

For this reason, an emission angle correction lens array (Ey), a conceptual diagram of which is illustrated in FIG. 10B, may be used. The emission angle correction lens array (Ey) separately collimates each of the bundles of rays from the semiconductor laser active regions (As, As', . . . ). In order to solve the above-described issue of the large divergent angle in the direction perpendicular to the substrate surface, each refractive surface in the emission angle correction lens array (Ey) is formed not to be spherical, but to be a surface that has different curvature radii between the direction vertical to the substrate surface and the direction parallel to the substrate surface, for example, to be a toric surface. This reduces the divergent angle in the direction parallel to the substrate surface as with the marginal rays (Lms1 and Lms2), and reduces more the divergent angle in the direction perpendicular to the substrate surface, ideally allowing the divergent angle in the direction parallel to the substrate surface and the divergent angle in the direction perpendicular to the substrate surface to be about the same.

The principal rays (Lps) from the respective semiconductor laser active regions (As, As', . . . ) are parallel to one another, and the series of beams is therefore compact. The semiconductor laser array device (LDA) provided with the emission angle correction lens array (Ey) illustrated in FIG. 10A and FIG. 10B may be preferably used as the semiconductor laser light source unit (Ls) illustrated in FIG. 7.

It is to be noted that, instead of achieving the toric surface, a cylindrical lens that has a curvature in the direction perpendicular to the substrate surface and is common to the semiconductor laser active regions (As, As', . . . ) as well as an array of cylindrical lenses that have curvature radii in the direction parallel to the substrate surface and are provided separately for the respective semiconductor laser active regions (As, As', . . . ) may be prepared to achieve, by the combination thereof, a function similar to that of the emission angle correction lens array (Ey).

A configuration example in a case where two semiconductor laser array devices (LDA and LDA') each provided with the emission angle correction lens array (Ey) described above are used together is illustrated in (a) of FIG. 11.

Series of beams from the respective semiconductor laser array devices (LDA and LDA') are synthesized into one bundle of beams with the use of beam synthesizing mirrors (MA and MA'). In this case, an arrangement may be preferably made so that all of the principal rays (Lps, Lps', . . . ) from the respective semiconductor laser array devices (LDA) are parallel to one another.

The semiconductor laser array devices (LDA and LDA') may be preferably used as the semiconductor laser light source unit (Ls) illustrated in FIG. 7. The first light emission region (Gs) formed thereby is as illustrated in (b) of FIG. 11. The respective semiconductor laser active regions of the semiconductor laser array devices (LDA and LDA') form the emission points (Ks, Ks', . . . ). A conjugate image having a shape similar to the shape of the first light emission region (Gs) formed of these emission points (Ks, Ks', . . . ) is formed by the second optical system (Ef) in the distance or at the infinite.

Here, the image formed by the bundle of rays (Bf) in the distance or at the infinite corresponds, in fact, to direction angle distribution of rays included in the bundle of rays (Bf).

A range of acceptable angle including rays, out of the rays inputted into the incident end (Pmi) of the light mixing section (Fm), that effectively propagate inside the light mixing section (Fm) and contribute to the formation of the illumination region (Gk) is not even, and is different between in an x-axis direction and in an y-axis direction illustrated in FIG. 8. Specific range of acceptable angle in each of the directions, i.e., a three-dimensional range of acceptable angle depends on an individual design of the light mixing section (Fm).

Consequently, it is advantageous to so arrange or distribute the emission points (Ks, Ks', . . . ) in the first light emission region (Gs) as to be suitable for the three-dimensional range of acceptable angle of the light mixing section (Fm) to be used.

Incidentally, to provide a supplementary description, in the case of the light mixing section (Fm) configured of the fly eye integrator illustrated in FIG. 8, the three-dimensional range of the acceptable angle described above has a shape almost similar to a shape of one of the Köhler illumination upstream lenses (Lk1, Lk2, . . . ).

Figure 16:
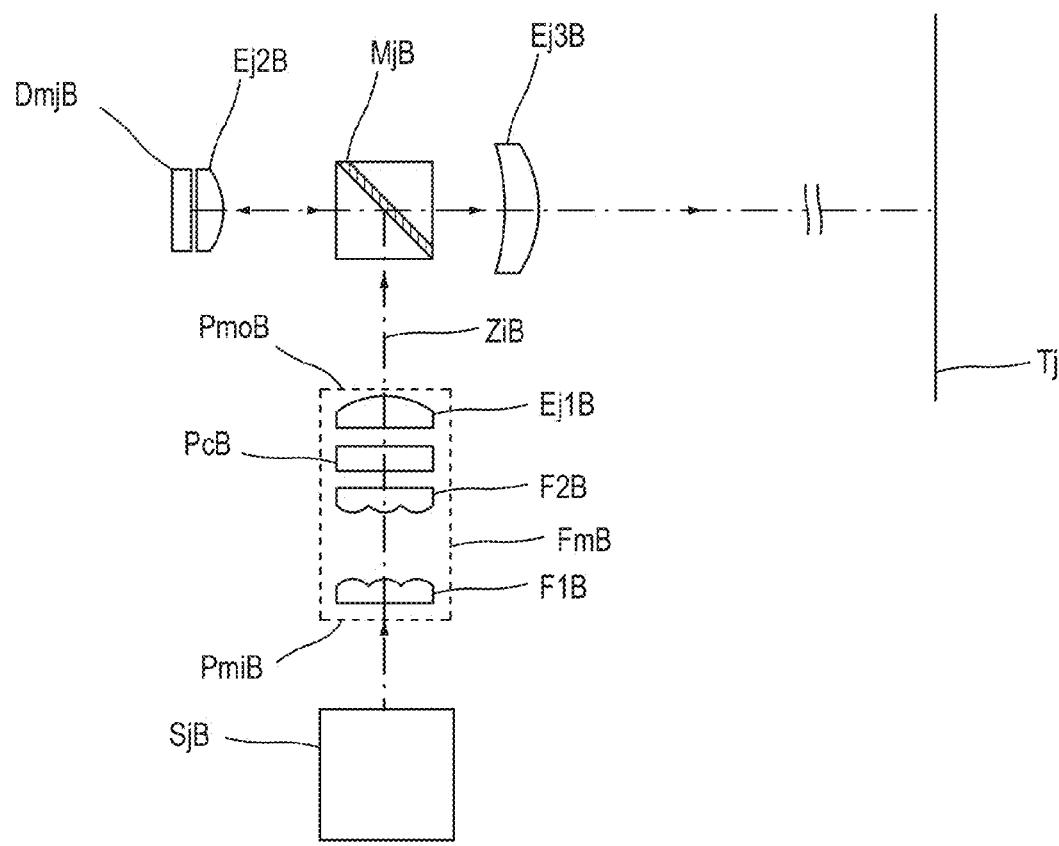
FIG. 16 is a principle diagram for explaining one mode of part of a kind of an existing projector related to the projector according to the embodiment of the invention.

However, in a case where the polarized-light alignment functional device (PcB) that has been described referring to FIG. 16 is included, the above-described three-dimensional range of acceptable angle may be further limited.

In connection with FIG. 11A and FIG. 11B, FIG. 12A and FIG. 12B further illustrate an example in which the semiconductor laser light source unit (Ls) is configured of three semiconductor laser array devices (LDA, LDA', and LDA"). When an arrangement is made so that the beam synthesizing mirrors (MA and MA') do not block beams even partially, taking into consideration a thickness, expanding angle, etc. of the beams from the semiconductor laser array devices (LDA, LDA', and LDA"), it is possible to use more semiconductor laser array devices (LDA, LDA', and LDA") according to the configuration method in FIG. 12A and FIG. 12B or in above-described FIG. 9.

Figure 12A:
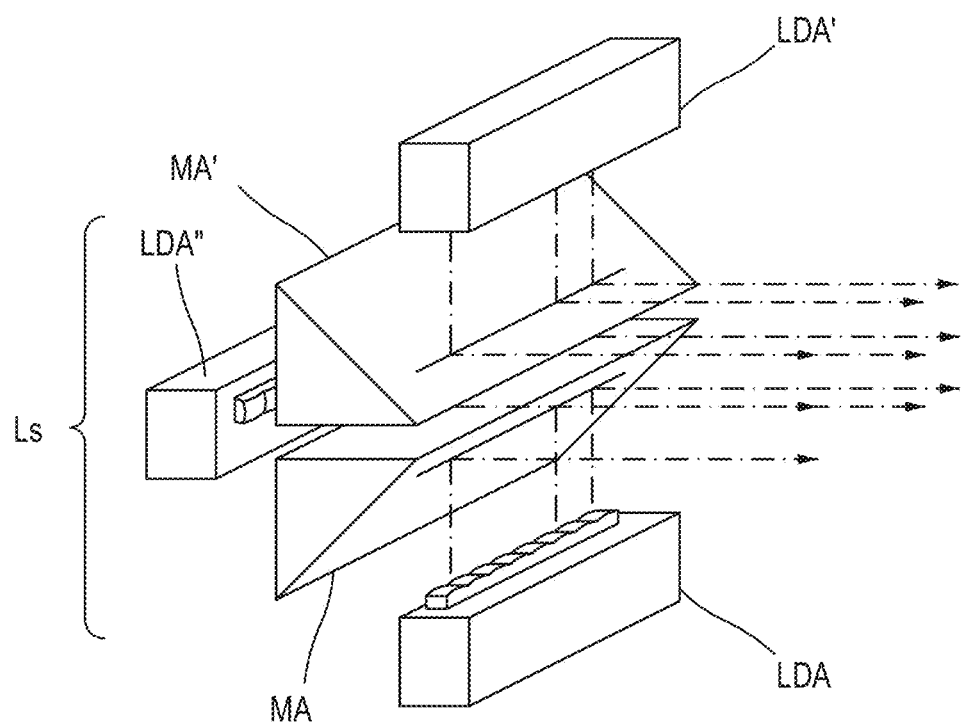
FIG. 12A and FIG. 12B are conceptual diagrams illustrating, in a simplified manner, one mode of part of the embodiment of the coherent light source apparatus of the invention.
Figure 12B:
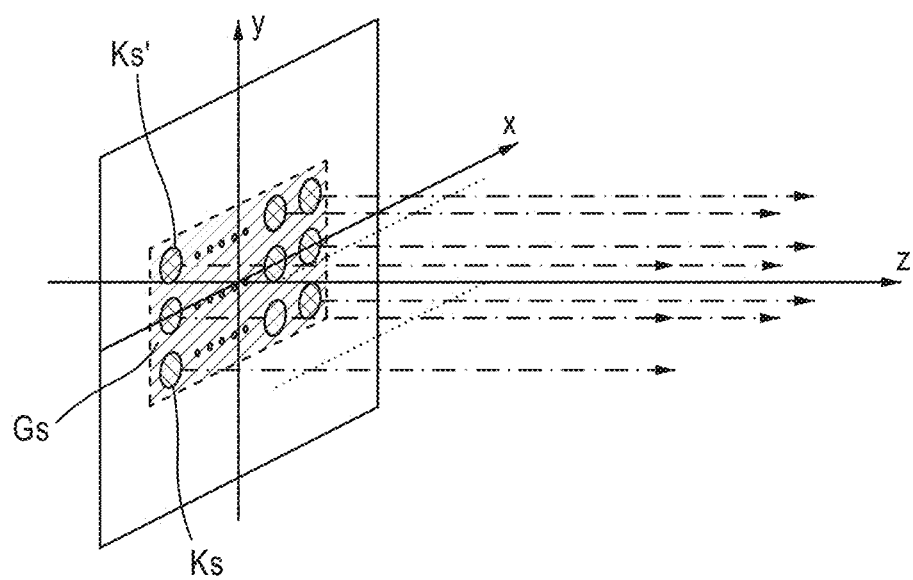

It is to be noted that the configuration illustrated in FIG. 12A and FIG. 12B may be preferably adopted in a case where the coherent light sources of three primary colors of R, G, and B are subjected to color synthesis to form the white first light emission region (Gs), in a case where the coherent light sources are driven based on the configuration in a time-divisional manner in order of R, G, and B to form the color-sequential first light emission region (Gs), or etc. In such cases, the semiconductor laser array devices (LDA, LDA', and LDA") may be disposed in correspondence with the respective colors of R, G, and B.

Figure 13:
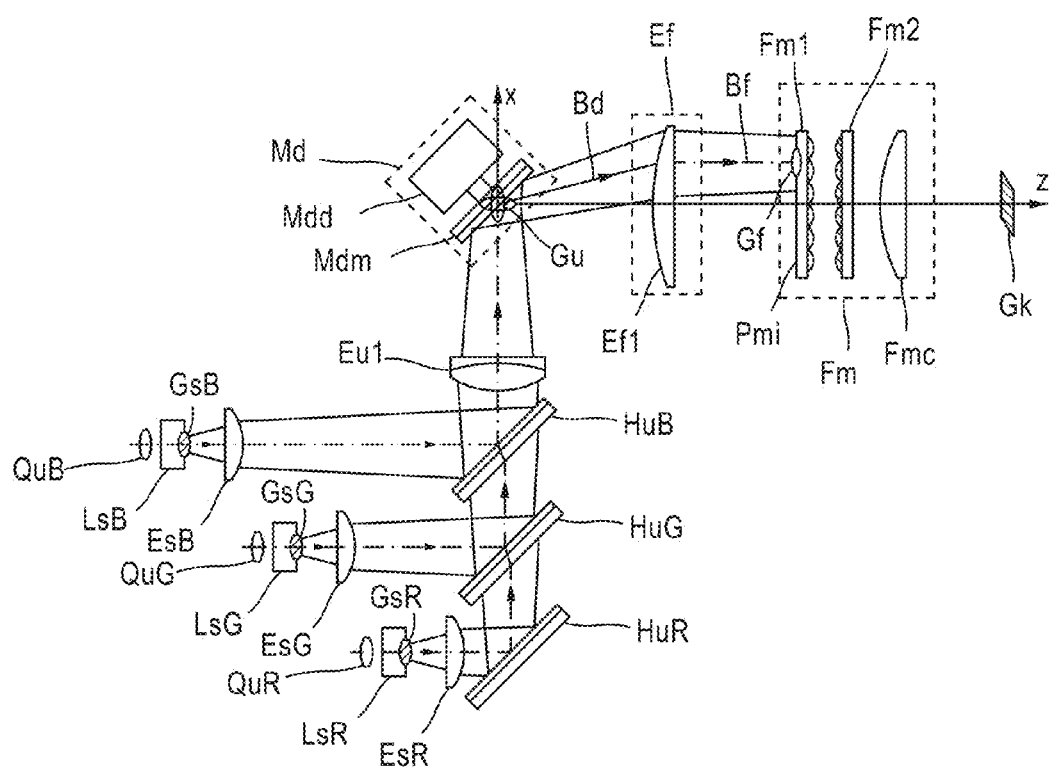
FIG. 13 is a conceptual diagram illustrating, in a simplified manner, one mode of an embodiment of the coherent light source apparatus of the invention.

Description is provided referring to FIG. 13 of a configuration in a case where single-color first light emission regions (Gs) are formed for the respective colors mentioned above, which are overlapped by a color synthesis section such as a dichroic mirror to send the overlapped light to the first optical system (Eu), thereby forming the color-synthesized first light emission region (Gs) consequently. In the optical system illustrated in FIG. 13, parts in forward positions of the imaging lens (Eu1) in the first optical system (Eu) are altered from those described above referring to FIG. 7.

A configuration is adopted in which the emission sections of divergent light that exist on surfaces of the semiconductor chips in the semiconductor laser light source units (LsR, LsG, and LsB) of the respective colors of R, G, and B are considered the first light emission regions (GsR, GsG, and GsB), and bundles of rays of images at the infinite into which divergent light from the first light emission regions (GsR, GsG, and GsB) are converted by the collimator lenses (EsR, EsG, and EsB) are subjected to color synthesis with the use of a mirror (HuR) and dichroic mirrors (HuG and HuB), followed by being inputted into the imaging lens (Eu1).

Functions of the imaging lens (Eu1) and optical systems downstream thereof are similar to the functions of those illustrated in FIG. 7. However, an image of the third light emission region (Gf) is formed, at the incident end (Pmi) of the light mixing section (Fm) configured of the fly eye integrator, as an image conjugate to exit pupils (QuR, QuG, and QuB) of the imaging lens (Eu1) that are formed for the respective colors of R, G, and B and are the exit pupils of the first optical system (Eu).

In the foregoing description, the first light emission region (Gs) and the first light emission regions (GsR, GsG, and GsB) in the coherent light source apparatus illustrated in FIGS. 7 and 13 are each configured of the semiconductor laser light source unit. However, the first light emission region (Gs) and the first light emission regions (GsR, GsG, and GsB) may each be replaced by the first light emission region (Gs) formed of an emission end (Pto) of an optical fiber (Fb) that has an incident end into which the light from the coherent light source (Sc) is inputted.

The optical guide and the fly eye integrator are mentioned herein as the light mixing section (Fm). However, as described above, any other device may be applicable as long as the device is capable of mixing the components of angles and positions of incident rays. In that case, it is advantageous to select a device that causes no increase in angle of rays with respect to the optical axis, in order not to decrease efficiency in utilizing light. For example, a device utilizing diffusion allows the spotty or patchy pattern of speckle to be finer and has strong function of making the speckle more difficult to be viewed. However, the device utilizing diffusion has strong properties that shift the angle distribution of rays toward a large angle side. For this reason, attention needs to be paid upon using the device utilizing diffusion.

Moreover, the optical guide is not limited to that having a simple quadrangular cylinder shape described above. For example, by adopting the following shapes, it is possible to accelerate mixing to increase interference and cause the spotty or patchy pattern of the speckle to be finer, which increases the function of making the speckle more difficult to be viewed. For example, the optical guide may have a quadrangular cross-section, perpendicular to the z axis which is the optical axis, that rotates as the quadrangular cross-section moves forward on the axis; in other words, the optical guide may have a shape of a quadrangular cylinder that is twisted around the axis. Alternatively, the optical guide may have a quadrangular emission end (Pmo), but may have an incident end (Pmi) having other shape (for example, a circular shape), and may have a shape that continuously varies so that the quadrangular cross-section perpendicular to the optical axis is changed in shape, as the cross-section moves forward on the axis, from circle to a polygonal having many angles and finally to a quadrangular, for example. However, attention needs to be paid for an optical guide that has a shape having cross-sectional area of a cross-section perpendicular to the optical axis that decreases as the cross-section moves forward on the axis. This is because an angle of light with respect to the axis is increased every time the light is reflected by side surfaces, and the angle distribution of rays is shifted toward the large angle side, as the light propagates forward.

In the embodiments above, the example has been mentioned in which the rotation swaying mirror configured of the deflection mirror (Mdm) and the mirror rotation motor (Mdd) is used as the light deflection section (Md). However, any member is applicable as long as the member is capable of deflecting an angle of a bundle of rays.

For example, a rotational non-parallel glass plate that rotates a glass plate having a wedge-shaped cross-section, a rotational image rotation prism that rotates an image rotation prism (such as a prism called a dove prism or a trapezoidal prism, and a prism having a reflective surface instead of a refractive surface) around an axis, a vibrating mirror that deflects an angle back and forth, a galvanometer, a polygon, etc. may be used. Out of these, the member, that rotates the optical device, such as the rotation swaying mirror, the rotational non-parallel glass plate, and rotational image rotation prism may be more preferable as the light deflection section of the embodiment of the invention than the member that has a structure to deflect the angle back and forth. This is because the member that rotates the optical device reduces mechanical vibration.

Moreover, the above-mentioned members have an advantage that a phenomenon that efficiency in utilizing light is varied depending on the deflection angle is less likely to occur. This is because of the following reason. A locus of the deflection direction sways to form a conical surface in accordance with the rotation of the optical device. This causes the deflection angle with respect to the central axis where there is no deflection to be constant even if the efficiency in utilizing light is decreased as a result of deflection, for example, in the light mixing section (Fm) or in components downstream thereof. In contrast, in the case of the member that deflects the angle back and forth, the mechanical vibration is increased easily, and efficiency in utilizing light is high at the deflection center. Accordingly, the efficiency in utilizing light may be decreased as the deflection angle is increased from the deflection center toward the outside. In other words, a phenomenon that the efficiency in utilizing light is varied may occur. Because such a disadvantage may appear easily, attention needs to be paid thereto.

Moreover, the light deflection section (Md) is not limited to that which performs a simple operation as described above. A so-called MEMS optical scanner or the like may be applied thereto that performs one-dimensional or two-dimensional scanning with the use of laser light by allowing the deflection mirror to vibrate with the use of a mirror vibrating device such as a piezoelectric drive mechanism or electromagnetic drive mechanism.

Figure 14:
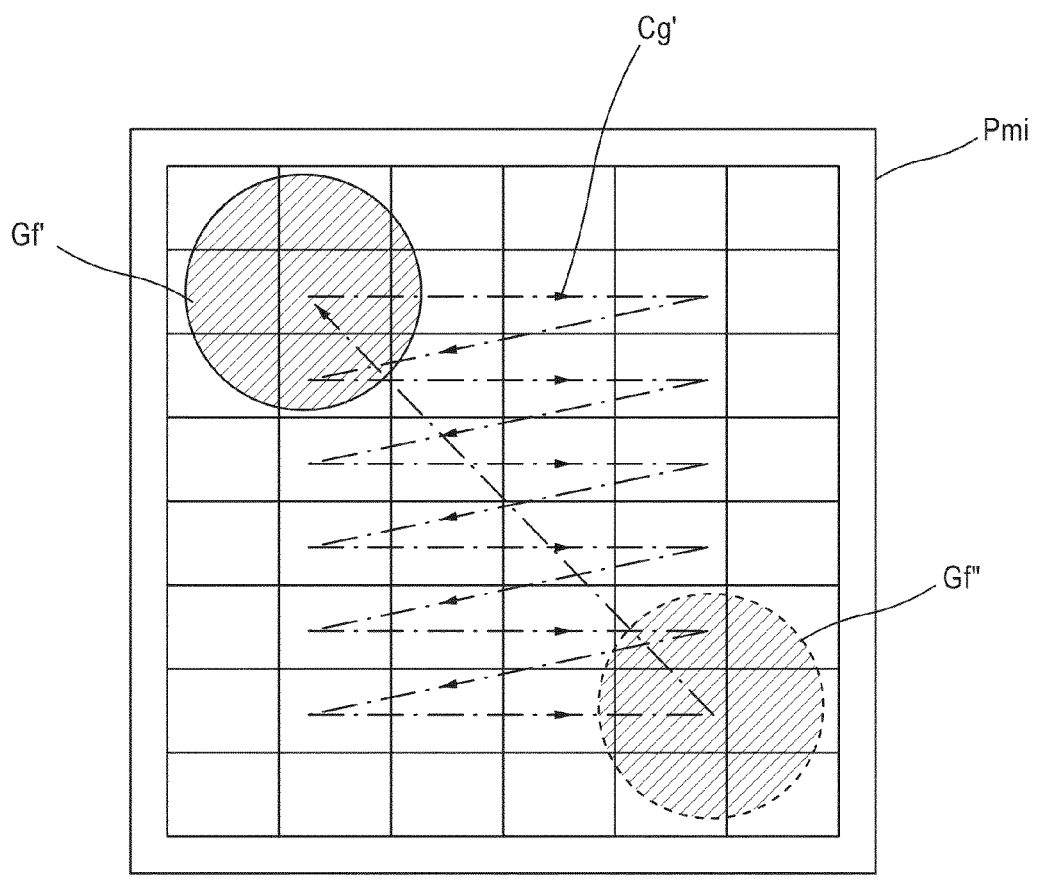
FIG. 14 is a conceptual diagram illustrating, in a simplified manner, one mode of part of the embodiment of the coherent light source apparatus of the invention.

FIG. 14 illustrates a state, in a case where the MEMS optical scanner performing two-dimensional scanning is used as the light deflection section (Md), that the third light emission region (Gf) formed as an image at the incident end (Pmi) of the light mixing section (Fm) configured of the fly eye integrator is displaced from the region (Gf') to the region (Gf'') in accordance with the change in the deflection direction caused by the light deflection section (Md).

A locus (Cg') of the center of the third light emission region (Gf) moves on a path to scan the incident end (Pmi) of the fly eye integrator.

As generally known in the field of lens design, structural conversion may be performed from an optical system configured of a single lens into an optical system that has the same function and is configured of a combination of a plurality of lenses, or vice versa. In particular, the former structural conversion may be used for a purpose, for example, of achieving a function that is physically unachievable by a single lens, or of reducing aberration by dispersing power of the lens into a plurality of lenses. Such a purpose may be achieved by setting, at favorable positions, a position of an input-side principal point and a position of an output-side principal point, or by introducing an afocal system, although a focal length of the targeted optical system is the same. In the embodiments above, the case where the first optical system (Eu) and the second optical system (Ef) are each configured of a lens system including a combination of a plurality of lenses is described. However, by utilizing the above-described structural conversion or using an aspherical lens to increase or decrease the number of lenses, it is possible to improve performance or cost.

Moreover, as a result of the above-described structural conversion, for example, the exit pupil (Quo) described above referring to FIG. 7 or the like may be made to exist inside the optical system, and confirmation thereof by placing a screen may become unable in some cases. However, this causes no particular problem.

INDUSTRIAL APPLICABILITY

The invention is applicable in industry of designing or manufacturing a coherent light source apparatus that is usable in an optical apparatus such as a projector and uses a coherent light source such as a laser.

REFERENCE SIGNS LIST

As semiconductor laser active region
As' semiconductor laser active region
Ba series of beams
Bd bundle of rays
Bf bundle of rays
Bf' bundle of rays
Bf" bundle of rays
Bg' partial bundle-of-ray group
Bg" partial bundle-of-ray group
Bmo bundle of rays
Bs bundle of rays
Bu bundle of rays
Cg locus
Cg' locus
Ci bottom face
CiA bottom face
DmjA two-dimensional light amplitude modulation device
DmjB two-dimensional light amplitude modulation device
Ds semiconductor laser light source
Ds' semiconductor laser light source
Ef1 collimator lens
Ec collimator lens
Ec' collimator lens
Ef second optical system
Ej1A illumination lens
Ej1B illumination lens
Ej2A projection lens
Ej2B field lens
Ej3B projection lens
Es collimator lens
EsB collimator lens
EsG collimator lens
EsR collimator lens
Eu first optical system
Eu1 imaging lens
Ex divergent lens
Ex' divergent lens
Ey emission angle correction lens array
F1B upstream fly eye lens
F2B downstream fly eye lens
Fb optical fiber
Fb' optical fiber
Fm light mixing section
Fm1 upstream fly eye lens
Fm2 downstream fly eye lens
FmA light uniformizing section
FmB light uniformizing section
Fmc illumination lens
Gf third light emission region
Gf' region
GF" region
Gk illumination region
Gs first light emission region
GsB first light emission region
GsG first light emission region
GsR first light emission region
Gu second light emission region
HuB dichroic mirror
HuG dichroic mirror
HuR mirror
Ks emission point
Ks' emission point
LCD liquid crystal device
LDA semiconductor laser array device
LDA' semiconductor laser array device
LDA" semiconductor laser array device
Lk1 Köhler illumination upstream lens
Lk2 Köhler illumination upstream lens
Lms1 marginal ray
Lms1A marginal ray
Lms2 marginal ray
Lms2A marginal ray
Lpf' principal ray
Lpf" principal ray
Lps principal ray
Lps' principal ray
Ls semiconductor laser light source unit
LsB semiconductor laser light source unit
LsG semiconductor laser light source unit
LsR semiconductor laser light source unit
MA beam synthesizing mirror
MA' beam synthesizing mirror
MD beam synthesizing mirror
MD' beam synthesizing mirror
Md light deflection section
Mdd mirror rotation motor
Mdm deflection mirror
MjA mirror
MjB polarization beam splitter
PcB polarized-light alignment functional device
Pmi incident end
PmiA incident end
PmiB incident end
Pmo emission end
PmoA emission end
PmoB emission end
Pto emission end
Pto' emission end
Qs point
Qu exit pupil
QuB exit pupil
QuG exit pupil
QuR exit pupil
Quo exit pupil
Sc coherent light source
SjA light source
SjB light source
Tj screen
ZiB incident optical axis

The invention claimed is:
1. A coherent light source apparatus comprising:
a coherent light source;
a first optical system configured to project light derived from a first light emission region to form a second light emission region, the first light emission region being formed on basis of the coherent light source;
a light deflection section configured to deflect a bundle of rays in vicinity of the second light emission region, the bundle of rays being related to formation of the second light emission region;

a second optical system provided downstream of the light deflection section; and a light mixing section provided downstream of the second optical system, and configured to mix components of angles and positions of rays incident on an incident end of the light mixing means, the second optical system being configured to form, in distance, an image conjugate to the first light emission region, and form, at the incident end, a third light emission region substantially conjugate to an exit pupil of the first optical system, and the light deflection section being configured to continue to perform an operation that causes a direction in which the bundle of rays is deflected to be continuously changed, and thereby causing the third light emission region to move continuously at the incident end.

2. The coherent light source apparatus according to claim 1, wherein the second light emission region is conjugate to the first light emission region.

3. The coherent light source apparatus according to claim 1, wherein the light mixing section is a fly eye integrator.

4. The coherent light source apparatus according to claim 1, further comprising an optical fiber including an incident end to which light derived from the coherent light source is inputted and an emission end, wherein the first light emission region is formed by the emission end of the optical fiber.

5. A projector provided with a coherent light source apparatus and configured to project and display an image with use of the coherent light source apparatus, the coherent light source apparatus comprising:

a coherent light source;

a first optical system configured to project light derived from a first light emission region to form a second light emission region, the first light emission region being formed on basis of the coherent light source;

a light deflection section configured to deflect a bundle of rays in vicinity of the second light emission region, the bundle of rays being related to formation of the second light emission region;

a second optical system provided downstream of the light deflection section; and a light mixing section provided downstream of the second optical system, and configured to mix components of angles and positions of rays incident on an incident end, the light mixing section being configured to serve as a light uniformizing section the second optical system being configured to form, in distance, an image conjugate to the first light emission region, and form, at the incident end, a third light emission region substantially conjugate to an exit pupil of the first optical system, and the light deflection section being configured to continue to perform an operation that causes a direction in which the bundle of rays is deflected to be continuously changed, and thereby causing the third light emission region to move continuously at the incident end.

\* \* \* \* \*